(12) United States Patent
Howie

(10) Patent No.: US 6,261,628 B1
(45) Date of Patent: *Jul. 17, 2001

(54) NONDIGESTIBLE FAT COMPOSITIONS CONTAINING SOLID POLYGLYCEROL ESTER PARTICLES FOR PASSIVE OIL LOSS CONTROL

(75) Inventor: John K. Howie, Oregonia, OH (US)

(73) Assignee: The Procter & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/169,918

(22) Filed: Dec. 20, 1993

Related U.S. Application Data

(63) Continuation-in-part of application No. 07/968,775, filed on Oct. 30, 1992, now abandoned.

(51) Int. Cl.$^7$ .................................................. A23D 9/007
(52) U.S. Cl. ........................................ 426/611; 426/804
(58) Field of Search ..................................... 426/611, 804

(56) References Cited

U.S. PATENT DOCUMENTS

| | | | |
|---|---|---|---|
| 2,266,591 | 12/1941 | Eckey et al. | 99/163 |
| 2,962,419 | 11/1960 | Minich | 167/81 |
| 3,059,009 | 10/1962 | Schmid et al. | 260/428 |
| 3,059,010 | 10/1962 | Schmid et al. | 260/428 |
| 3,093,481 | 6/1963 | Eckey et al. | 99/118 |
| 3,158,490 | 11/1964 | Baur et al. | 99/118 |
| 3,353,966 | 11/1967 | Hugenberg et al. | 99/163 |
| 3,353,967 | 11/1967 | Lutton | 99/163 |
| 3,495,010 | 2/1970 | Fossel | 424/312 |
| 3,495,011 | 2/1970 | Fossel | 424/312 |
| 3,600,186 | 8/1971 | Mattson et al. | 99/1 |
| 3,637,774 | 1/1972 | Babayan et al. | 260/410.6 |
| 3,649,647 | 3/1972 | Masanori et al. | 260/345.8 |
| 4,005,195 | 1/1977 | Jandacek | 424/180 |
| 4,005,196 | 1/1977 | Jandacek et al. | 424/180 |
| 4,368,213 | 1/1983 | Hollenbach et al. | 426/590 |
| 4,797,300 | 1/1989 | Jandacek et al. | 426/549 |
| 4,919,964 | 4/1990 | Adams et al. | 426/564 |
| 4,960,602 | 10/1990 | Talkington et al. | 426/534 |
| 4,962,092 | 10/1990 | Wood | 514/23 |
| 5,017,398 | 5/1991 | Jandacek et al. | 426/603 |
| 5,085,884 | 2/1992 | Young et al. | 426/611 |
| 5,102,683 | 4/1992 | Letton et al. | 426/601 |
| 5,137,743 | 8/1992 | Zaks et al. | 426/602 |
| 5,158,796 | 10/1992 | Bernhardt et al. | 426/549 |

(List continued on next page.)

FOREIGN PATENT DOCUMENTS

| | | | |
|---|---|---|---|
| 207070 | 2/1984 | (DE) | A23I/1/30 |
| 227137 | 9/1985 | (DE) . | |
| 233856 | 8/1987 | (EP) | A23D/5/00 |
| 236288 | 9/1987 | (EP) | A23D/5/00 |
| 311154 | 4/1989 | (EP) | C07H/13/06 |
| 0 325 463 | 7/1989 | (EP) | C07C/69/675 |
| 375027 | 6/1990 | (EP) | A23D/9/00 |
| 424066 | 4/1991 | (EP) | C07H/13/06 |
| 434119 | 6/1991 | (EP) | C07H/13/06 |
| 434177 | 6/1991 | (EP) | C07H/13/06 |
| 49-26220 | 3/1974 | (JP) . | |
| 52/27694 | 7/1977 | (JP) . | |
| 58-78531 | 5/1983 | (JP) | A21D/2/16 |
| 9062-511 | 4/1984 | (JP) . | |
| 59-143550 | 8/1984 | (JP) . | |
| 59/156242 | 9/1984 | (JP) . | |
| 2020-247 | 1/1990 | (JP) . | |
| 04237458 | 8/1992 | (JP) | A23D/9/00 |
| 3-81042 | 8/1992 | (JP) | A23D/9/00 |
| WO 91/10368 | 7/1991 | (WO) | A23D/7/00 |
| WO 91/15960 | 10/1991 | (WO) | A23D/7/00 |
| WO 91/15961 | 10/1991 | (WO) | A23D/7/00 |
| WO 91/15962 | 10/1991 | (WO) | A23D/9/00 |
| WO 91/15963 | 10/1991 | (WO) | A23D/9/00 |
| WO 92/03937 | 3/1992 | (WO) | A23L/1/308 |
| WO 92/04360 | 3/1992 | (WO) | C07H/13/06 |
| WO 92/17077 | 10/1992 | (WO) | A23L/1/308 |

OTHER PUBLICATIONS

U.S. Patent application Ser. No. 07/969,670, JJ Elsen et al, filed Oct. 30.*
U.S. Patent application Ser. No. 07/941,845, filed Sep. 8, 1992 (pending US Counterpart of EPA 311154).*
U.S. Patent application Ser. No. 07/946,257, filed Sep. 16, 1992.*
U.S. Patent application Ser. No. 07/969,607, Johnston et al, filed Oct. 30, 1992.*
U.S. Patent application Ser. No. 07/968,780, P.J. Corrigan et al, filed Oct. 30, 1992.*
U.S. Patent application Ser. No. 07/968,791, P.J. Corrigan et al, filed Oct. 30, 1992.*
U.S. Patent application Ser. No. 07/968,792, P.J. Corrigan et al, filed Oct. 30, 1992.*

*Primary Examiner*—Carolyn Paden
(74) *Attorney, Agent, or Firm*—Tara M. Rosnell; Erich D. Hemm; Carl J. Roof

(57) ABSTRACT

Nondigestible fat compositions useful as a replacement for triglyceride fats or oils in foods are disclosed. The compositions have relatively flat Solid Fat Content (SFC) profile slopes between typical room and body temperatures. The nondigestible fat compositions comprise a liquid nondigestible oil and nondigestible solid polyglycerol ester particles dispersed in the oil in an amount sufficient to control passive oil loss. The ester groups of the solid polyglycerol ester particles comprise long chain ($C_{16}$–$C_{24}$) fatty acid radicals, with at least about 40% of the long chain fatty acid radicals being saturated and having at least 18 carbon atoms. The Iodine Value of these polyglycerol ester is less about 1. Edible fat-containing products containing these nondigestible fat compositions can be less waxy tasting due to the lower level of solids required for passive oil loss control.

19 Claims, 2 Drawing Sheets

U.S. PATENT DOCUMENTS

| | | | |
|---|---|---|---|
| 5,194,270 | 3/1993 | Cante et al. | 426/74 |
| 5,219,604 | 6/1993 | Klemann et al. | 426/531 |
| 5,225,049 | 7/1993 | Barmentlo et al. | 203/34 |
| 5,230,913 | 7/1993 | Klemann | 426/97 |
| 5,236,733 | 8/1993 | Zimmermann et al. | 426/611 |
| 5,308,640 | 5/1994 | Baer et al. | 426/611 |
| 5,366,753 * | 11/1994 | Meyer | 426/611 |
| 5,422,131 * | 6/1995 | Elsen | 426/611 |
| 5,451,416 * | 9/1995 | Johnston | 426/611 |
| 5,480,667 * | 1/1996 | Corrigan | 426/611 |
| 5,490,995 * | 2/1996 | Corrigan | 426/531 |
| 6,077,556 * | 6/2000 | Letton | 426/549 |

* cited by examiner

NONDIGESTIBLE FAT COMPOSITIONS CONTAINING SOLID POLYGLYCEROL ESTER PARTICLES FOR PASSIVE OIL LOSS CONTROL

CROSS REFERENCE TO RELATED APPLICATION

This is a continuation-in-part of U.S. patent application Ser. No. 07/968,775, filed Oct. 30, 1992 now abandoned.

TECHNICAL FIELD

The present invention relates to nondigestible fat compositions that are useful as full or partial replacers for triglyceride fats or oils in foods. More particularly, the present invention provides such nondigestible fat compositions that provide passive oil loss control without being excessively waxy tasting.

BACKGROUND OF THE INVENTION

Certain polyol fatty acid polyesters have been suggested as low or reduced calorie substitutes for triglyceride fats and oils used in foods. For example, nonabsorbable, nondigestible sugar fatty acid esters or sugar alcohol fatty acid esters having at least 4 fatty acid ester groups with each fatty acid having from 8 to 22 carbon atoms have been used as partial or full fat replacers in low calorie food compositions. (See Mattson & Volpenhein; U.S. Pat. No. 3,600,186; Issued Aug. 17, 1971.) Foods in which these polyol polyesters are particularly useful as partial or complete replacements for triglyceride fats or oils include products suitable for use in frying. Unfortunately, regular ingestion of moderate to high levels of completely liquid forms of these polyol polyesters can produce undesirable passive oil loss, namely, leakage of the polyesters through the anal sphincter. By contrast, completely solid versions of these polyesters provide a sufficiently high solids content at mouth temperatures (e.g., 92° F., 33.3° C.) such that they give a waxy taste or impression in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. (See Bernhardt; European Patent Application Nos. 236,288 and 233,856; Published September 9, and Aug. 26, 1987, respectively.) These intermediate melting polyol polyesters exhibit a unique rheology at body temperature by virtue of their having a matrix which involves a minimal level of solids (e.g. about 12% or lower) that bind the remaining liquid portion. As a result, these intermediate melting polyol polyesters are sufficiently viscous and have a sufficiently high liquid/solid stability at body temperature to provide passive oil loss control. An example of such intermediate melting polyol polyesters are those obtained by substantially completely esterifying sucrose with a 55:45 mixture of fully hydrogenated (hardstock) and partially hydrogenated soybean oil fatty acid methyl esters. (See Examples 1 and 2 of the above European patent applications.) These intermediate melting polyol polyesters can be used as total or partial replacements for other fats and oils in various food products, including cooking and frying oils. However, it has been found that certain foods such as potato chips fried in frying fats containing substantial levels of these nondigestible intermediate melting polyol polyesters, particularly at levels in excess of about 40%, can give a significantly increased waxiness impression compared to potato chips that have been fried in the digestible triglyceride fat or oil that the nondigestible polyol polyester has partially replaced. (In terms of physical properties, "waxiness" relates to how the fat composition is sensed in the mouth, and specifically relates in part to the sensation of the product having a relatively high level of solids.) Indeed, this increased waxiness impression with regard to these intermediate melting polyol polyesters is recognized in the aforementioned European Patent Application No. 233,856 inasmuch as that application discloses fat compositions which contain digestible food materials, such as triglycerides and substituted mono- and diglycerides, that act as solvents for the intermediate melting polyol polyesters. However, as the proportion of triglycerides is increased relative to the intermediate melting polyol polyesters so as to impart less waxiness, the caloric content of the frying fat also increases accordingly. In addition, it has been found that frying fats containing greater than about 40% of these intermediate melting polyol polyesters can adversely affect the flavor display of the resulting fried food, in particular potato chips.

The waxiness impression imparted by intermediate melting polyol polyesters such as those of the aforementioned European '288 and '856 applications is believed to be due at least in part to their change in Solid Fat Content (SFC), particularly between typical room temperature (i.e. 70° F., 21.1° C.) and body temperature (i.e. 98.6°, 37° C.). For example, the intermediate melting sucrose polyester of Example 2 of European Patent Application Nos. 233,856 and 236,128 has an SFC profile slope (as hereinafter defined) between room temperature and body temperature of about −1.3. In other words, the SFC profile slope of these intermediate melting polyol polyesters is relatively steep. Given this relatively steep SFC profile slope, the change in solids content of these intermediate melting polyol polyesters can be sufficiently great such that a high level of solids will be sensed when such room temperature materials are first placed in the mouth, thereby leading to an increased waxiness sensation.

Blends of completely liquid polyol polyesters with completely solid polyol polyester hardstocks, preferably esterified with $C_{10}$–$C_{22}$ saturated fatty acids (e.g. sucrose octastearate), have also been proposed in order to provide passive oil loss control. (See, for example, Jandacek; U.S. Pat. No. 4,005,195; and Jandacek/Mattson; U.S. Pat. No. 4,005,196; Both issued Jan. 25, 1977.) Blends of these liquid polyol polyesters and solid polyol polyesters hardstocks have relatively flat SFC profile slopes between typical room temperature and body temperature, i.e. slopes of from 0 to about 0.3, and more typically from 0 to about −0.1. In other words, there is little or no change in the solids content of these blends between room temperature and body temperature.

Although providing at least temporary passive oil loss control, blends of liquid polyol polyesters and solid polyol polyester hardstocks according to the aforementioned U.S. '195 and '196 patents do not necessarily provide passive oil loss control over an extended period of time. It has been found that these solid polyol polyester hardstocks normally tend to form large spherulitic particles (typically from about 3 to about 32 microns in size) in the liquid polyol polyesters. These large spherulitic particles may tend to phase separate from the liquid polyol polyesters during storage of such blends. As a result, a two-phase system can develop with the liquid portion thereof providing minimal or no passive oil loss control.

In addition, blends of liquid polyol polyesters and solid polyol polyester hardstocks according to the aforementioned U.S. Pat. Nos. 4,005,195 and 4,005,196 do not necessarily lead to less waxy tasting products. As taught in these patents, a relatively high level of solid polyol polyester hardstock is required to provide passive oil loss control. For example, hardstock is preferably used in an amount of from about 20% to about 50% by weight of the liquid polyol polyester. (See Column 9, lines 65–68, of U.S. Pat. No. 4,005,195.) Such a level of solid polyol polyester hardstock used for passive oil loss control at body temperature can lead to a waxy tasting product due to the relatively high level of solids that will also be present at mouth temperature.

In view of the foregoing, it would be desirable to provide nondigestible fat compositions comprising blends of liquid polyol polyesters and solid polyol polyester hardstock particles with such blends exhibiting little or no phase separation of the hardstock particles from the liquid polyol polyesters. In addition, it would be desirable to be able to reduce the level of solid polyol polyester hardstock required for effective passive oil loss control so as to provide less waxy tasting products.

In addition to being useful as passive oil loss control agents when combined with liquid nondigestible oils, certain polyol polyesters which are solid at temperatures of about 25° C. and higher have also been used as thickening agents for conventional digestible triglyceride oils. For example, these solid polyol polyesters have been used as "thickening agents" for blending with liquid digestible or nondigestible oils in formulations such as shortenings, as well as in other food products which contain a combination of fat and non-fat ingredients, e.g., margarines, mayonnaise, frozen dairy desserts and the like. (See, for example, Jandacek and Letton; U.S. Pat. No. 4,797,300; Issued Jan. 10, 1989.) However, these prior art thickening agents had to be used at levels of 10 to 25%. Accordingly, it would be desirable to reduce the level of thickening agents of this type in order to provide less waxy tasting products.

SUMMARY OF THE INVENTION

The present invention relates to nondigestible fat compositions which are useful as replacements for triglyceride fats and oils in food products. Such compositions have a Solids Fat Content SFC) profile slope between room temperature (70° F.) and body temperature (98.6° F.) of from 0 to about −0.75% solids/° F. Such compositions furthermore comprise a liquid nondigestible oil component having dispersed therein nondigestible solid polyglycerol ester particles in an amount sufficient to control passive oil loss upon the ingestion of the nondigestible fat compositions.

The liquid nondigestible oil component of the compositions herein is one which has a complete melting point below about 37° C. The polyglycerol esters which can be used to form the nondigestible solid polyglycerol ester particles used as oil loss control agents in compositions herein are those which have a complete melting point above about 37° C., wherein the ester groups therein comprise long chain ($C_{16}$–$C_{26}$) fatty acid radicals with at least about 40% of these long chain fatty acids having at least 18 carbon atoms. The polyglyol esters used to form the nondigestible solid polyglycerol ester particles further have an Iodine Value of less than about 1. The nondigestible solid polyglycerol ester particles dispersed in the liquid nondigestible component of the compositions herein can be further characterized as those which impart to the fat compositions herein a Thixotropic Area Value (as hereinafter defined) of at least about 10 kPa/sec.

The nondigestible fat compositions of the present invention provide significant advantages over known intermediate melting polyol polyesters, as well as prior art blends of liquid polyol polyesters and polyol polyester hardstocks. The relatively small nondigestible particles provide especially efficient passive oil loss control. As a result, the level of solids at body temperature required for passive oil loss control can be reduced to relatively low levels (e.g., to less than about 20%, preferably to less than 15% of the nondigestible fat). In addition, the nondigestible fats of the present invention have relatively flat SFC profile slopes, thus leading to minimal or no change in the solids content between typical room and body temperature. This combination of the relatively low solids levels required for passive oil loss control, with minimal/no solids content change between room and body temperatures, can result in less waxy tasting products containing these nondigestible fats.

The present invention also relates to digestible fat compositions which utilize particles of the hereinbefore described nondigestible polyol polyester material as thickening agents. Such compositions comprise from about 85% to about 99% of a digestible edible oil and from about 1% to about 15% of the nondigestible solid polyol polyester particles.

DETAILED DESCRIPTION OF THE INVENTION

A. Definitions

Figure 1:
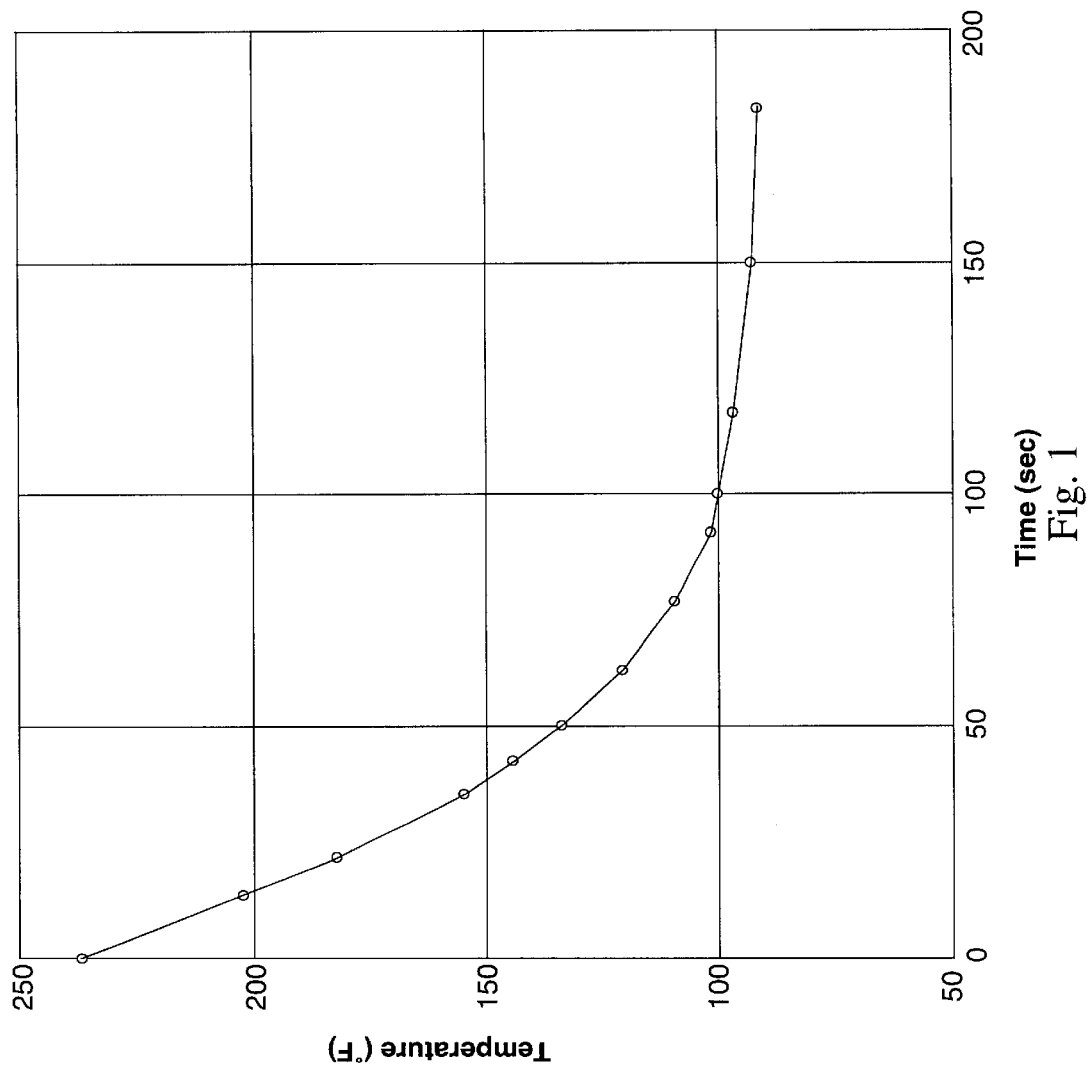
FIG. 1 is a template depicting the cooling profile of a potato chip.

By "nondigestible" his meant that only about 70% or less, preferably only 20% or less, more preferably 1% or less of a material can hydrolyzed versus a triglyceride by the enzymes in the lipase test, described hereinafter in the Analytical Section.

As used herein, the term "thickness" of a particle is used in its conventional sense of the smallest of the three dimensions (length, width, height) of any given particle.

As used herein, the term "spherulitic" refers to substantially spherical or round, essentially three-dimensional particles.

As used herein, the term "platelet-like" refers to substantially flat, essentially two-dimensional type of particle having length and width in the unfolded planar configuration that is substantially greater in dimension than its thickness.

As used herein, the terms "filament-like" and "rod-like" refer to elongated, essentially one-dimensional particles.

As used herein, the term "complete melting point" refers to the temperature at which all solid components have melted. All melting points referred to herein are measured by Differential Scanning Calorimetry (DSC) as described hereinafter.

As used herein, the term "comprising" means various components, or steps, can be conjointly employed in the nondigestible fats, compositions, and processes of the present invention. Accordingly, the term "comprising" encompasses the more restrictive terms "consisting essentially of" and "consisting of".

By "polyol" is meant a polyhydric alcohol containing at least 4, preferably from 4 to 12, more preferably from 4 to 8, most preferably from 6 to 8, hydroxyl groups. Polyols thus include sugars (i.e., monosaccharides, disaccharides and trisaccharides), sugar alcohols (i.e., the reduction product of sugars wherein the aldehyde or ketone group has been reduced to an alcohol), other sugar derivatives (e.g., alkyl glycosides), polyglycerols such as diglycerol and triglycerol, pentaerythritol, and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose. Preferred polyols include erythritol, xylitol, sorbitol, and glucose, with sucrose being an especially preferred polyol.

By "polyol polyester" is meant a polyol as hereinbefore defined having at least 4 ester groups, i.e., at least 4 of the hydroxyl groups are esterified with fatty or other organic acids. Polyol esters that contain 3 or less fatty acid ester groups are digested in (and the products of digestion are absorbed from) the intestinal tract much in the manner of ordinary triglyceride fats or oils, whereas those polyol esters which contain 4 or more ester groups are substantially nondigestible and consequently nonabsorbable by the human body. It is not necessary that all of the hydroxyl groups of the polyol be esterified, but it is preferable that disaccharide molecules contain no more than 3 unesterified hydroxyl groups, and more preferably no more than 2 unesterified hydroxyl groups, so that they are rendered nondigestible. Typically, substantially all (e.g., at least about 85%) of the hydroxyl groups of the polyol are esterified. For liquid polyol polyesters, preferably at least about 95% of the hydroxyl groups of the polyol are esterified. In the case of sucrose polyesters, typically from about 7 to 8 of the hydroxyl groups of the polyol are esterified.

By "ester group" is meant a moiety formed from the reaction of a hydroxyl group with an organic acid or acid derivative which moiety contains fatty acid and/or other organic radicals having at least 2 carbon atoms, typically at least 8 carbon atoms, more typically at least 12 carbon atoms, most typically at least 16 carbon atoms. Representative examples of such fatty acid and other organic acid radicals include acetic, propionic, butyric, caprylic, capric, lauric, myristic, myristoleic, palmitic, palmitoleic, stearic, oleic, elaidic, ricinoleic, linoleic, linolenic, eleostearic, arachidic, arachidonic, behenic, lignoceric, erucic, and cerotic fatty acid radicals and other organic acid radicals including aromatic ester-forming radicals such as benzoic and toluic; branched chain radicals such as isobutyric, neooctanoic or methyl stearic; ultra-long chain saturated or unsaturated fatty acid radicals such as tricosanoic or tricosenoic; cyclic aliphatics such as cyclohexane carboxylic; and polymeric ester-forming radicals such as polyacrylic or dimer fatty acid. The fatty or other organic acid radicals can be derived from naturally occurring or synthetic acids. The acid radicals can be saturated or unsaturated, including positional or geometric isomers, e.g. cis- or trans-isomers, straight chain or branched chain aromatic or aliphatic, and can be the same for all ester groups, or can be mixtures of different acid radicals.

All percentages, ratios and proportions used herein are by weight unless otherwise specified.

B. Liquid Nondigestible Oil

A key component of the nondigestible fat composition herein is a liquid nondigestible oil having a complete melting point below about 37° C. Suitable liquid nondigestible edible oils for use herein include liquid polyol polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycosides fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); as well as liquid polydimethyl siloxanes (e.g., Fluid Silicones available from Dow Corning). All of the foregoing patents relating to the liquid nondigestible oil component are incorporated herein be reference.

Preferred liquid nondigestible oils are the liquid polyol polyesters that comprise liquid sugar fatty acid polyesters, liquid sugar alcohol fatty acid polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 8 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, fractionated palm oil fatty acids, palm kernel oil fatty acids, coconut oil fatty acids, tallow fatty acids and lard fatty acids.

The nondigestible polyol fatty acid polyesters that are liquid are those which have minimal or no solids at body temperatures (i.e., 98.6° F., 37° C.). These liquid polyol polyesters typically contain ester groups having a high proportion of $C_{12}$ or lower fatty acid radicals or else a high proportion of $C_{18}$ or higher unsaturated fatty acid radicals. In the case of those liquid polyol polyesters having high proportions of unsaturated $C_{18}$ or higher fatty acid radicals, at least about half of the fatty acids incorporated into the polyester molecule are typically unsaturated. Preferred unsaturated fatty acids in such liquid polyol polyesters are oleic acid, linoleic acid, and mixtures thereof.

The following are nonlimiting examples of specific liquid polyol polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol polyesters suitable for use in the compositions herein can be prepared by a variety of methods known to those skilled in the art. These methods include: transesterification of the polyol (i.e. sugar or sugar alcohol) with methyl, ethyl or glyceryl fatty acid esters containing the desired acid radicals using a variety of catalysts; acylation of the polyol with a fatty acid chloride; acylation of the polyol with a fatty acid anhydride; and acylation of the polyol with the desired acid, per se. (See, for example, U.S. Pat. Nos. 2,831,854, 3,600,186, 3,963,699, 4,517,360 and 4,518,772, all of which are incorporated by reference. These patents disclose suitable methods for preparing polyol fatty acid polyesters.)

C. Solid Polyglycerol Ester Component

A second key component of the nondigestible fat compositions herein comprises relatively small nondigestible solid particles of certain polyglycerol esters that are dispersed in the liquid nondigestible oil to control or prevent passive oil loss. These particles can be in a variety of forms and shapes, including spherulitic, platelet-like, filament-like or rod-like, or combinations of these various shapes, but are typically spherulitic or platelet-like. The thickness of these particles is typically about 1 micron or less. Thinner particles, however, are preferred from the standpoint of providing more efficient passive oil loss control of the liquid nondigestible oil component of the compositions herein. Accordingly, these particles preferably have a thickness of about 0.1 micron or less, more preferably about 0.05 micron or less. These particles also have a complete melting point of above about 37° C., preferably above about 50° C., more preferably above about 60° C.

The polyol polyester material which forms these nondigestible particles should have a complete melting point as measured by the Differential Scanning Calorimetry (DSC) described hereinafter in the Analytical Methods section which is sufficiently high such that the nondigestible particles themselves will have the hereinbefore specified melting point characteristics when such particles are dispersed in the liquid nondigestible oil. For example, a polyol polyester material having a complete melting point right at 37° C. may not form solid particles having a complete melting point above about 37° C. when such particles are dispersed in the liquid nondigestible oil. Thus, in some cases, the complete melting point of the neat polyol polyester material may have to be slightly higher than 37° C., e.g., about 40° C. or higher, in order to form solid particles having a complete melting point of 37° C. when such particles are combined with the liquid nondigestible oil.

These nondigestible particles can generally be dispersed as discrete, unaggregated entities in the liquid nondigestible oil. However, these nondigestible particles can also cluster together to form much larger aggregates which are dispersed in the liquid nondigestible oil. This is particularly true of those nondigestible particles that are platelet-like in form. Aggregates of platelet-like nondigestible particles typically assume a spherulitic shape that is porous in character and thus capable of entrapping significant amounts of liquid nondigestible oil. It is believed that this porous structure and its concomitant ability to entrap large amounts of liquid nondigestible oil is why these aggregated, platelet-like particles, while not as efficient as the particles in unaggregated form, can provide very effective and efficient passive oil loss control.

The polyglycerol esters used to form the fat compositions of the present invention contain at least about 2 glycerol moieties, more preferably from about 3 to 10 glycerol moieties, even more preferably from 4 to 8 glycerol moieties, and most preferably from 4 to 6 glycerol moieties.

Typically mixtures of polyglycerol esters are employed have an average degree of glycerine polymerization (n-bar) as hereinafter defined in the Analytical Methods section of from about 2 to 10, preferably from about 3 to 8, more preferably from about 3 to 6. The distribution of the number of glycerol moieties in such polyglycerol ester mixture may be narrow or broad. Typically, at least about 30% of the hydroxyl groups of the polyglycerol esters are esterified with fatty acids. Preferably at least about 50% of the hydroxyl groups are esterified. The percent esterification of the polyglycerol ester material used herein can be determined in the manner set forth hereinafter in the Analytical Methods section.

The ester groups which form the solid polyglycerol ester component herein comprise long chain ($C_{16}$–$C_{26}$) fatty acid radicals with at least 40% of these long chain fatty acids being saturated and having at least 18 carbon atoms. Preferably, at least about 50% of the long chain fatty acids are saturated and have at least 18 carbon atoms, more preferably at least about 75% of the long chain fatty acids are saturated have at least 18 carbon atoms, most preferably at least about 85% of the long chain fatty acids are saturated have at least 18 carbon atoms.

The fatty acid radicals forming the ester groups on the polyglycerol ester component herein may be saturated or unsaturated. The polyglycerol ester component can, in fact, be further characterized by specifying an Iodine Value which is a measure of the degree of unsaturation of the fatty acids which form the ester groups. The solid polyglycerol esters of this invention typically have an Iodine Value of less than 50. Preferably, the solid polyglercol esters of this invention have an Iodine Value of less than about 20, more preferably less than about 10, even more preferably less than about 5, and most preferably less than about 1.

Mixed fatty acids from source oils (e.g., soybean oil, cottonseed oil, safflower, rapeseed oil, canola, corn oil, sunflower oil, and tallow) which contain the desired fatty acids can be used to form the fatty acid radicals of the ester groups of the polyglycerol ester materials used herein. For example, hardened (i.e., hydrogenated) high erucic rapeseed oil fatty acids can be used instead of pure behenic fatty acid. The fatty acids can be used "as is" and/or after hydrogenation, and/or isomerization, and/or purification. Preferably, the behenic acid (or its derivatives—e.g., methyl esters) are concentrated, for example, by distillation.

The solid polyglycerol ester materials used herein can be made according to known methods for preparing polyol polyesters. One such method of preparation comprises reacting the acid chlorides or acid anhydrides of the desired ester-forming acids, or the acids per se, with polyglycerol. This can be accomplished using a sequential esterification process or a process in which all the fatty acids are mixed together and added at once. See Letton; European Patent 311,154; published Apr. 12, 1989.

Another method for preparing these solid polyglycerol esters is by a process which comprises reacting the methyl esters of the respective desired acids with polyglycerol in the presence of a fatty acid soap and a basic catalyst such as potassium carbonate. See, for example, Rizzi et al; U.S. Pat. No. 3,963,699; issued Jun. 15, 1976; Volpenhein; U.S. Pat. No. 4,518,772; Issued May 21, 1985; and Volpenhein; U.S. Pat. No. 4,517,360; Issued May 14, 1985, all of which relate to polyol polyester synthesis and which are incorporated by reference.

D. Preparation of Nondigestible Fat Compositions Which Exhibit Minimal Passive Oil Loss To prepare the nondigestible fat compositions herein which exhibit improved passive oil loss control, the liquid nondigestible oil is combined with the particles of the solid polyglycerol esters hereinbefore described. The polyglycerol ester particles are used in an amount sufficient to control or prevent passive oil loss. What constitutes "an amount sufficient to control or prevent passive oil loss" for any given fat composition depends on the particular polyglycerol esters utilized therein, the particular passive oil loss control benefits desired, and the level of waxiness mouth impression that can be tolerated for the particular end product use of the nondigestible fat composition which is formulated. Typically, the nondigestible fat composition so formed will comprise from about 60% to about 99% of the liquid nondigestible oil and from about 1% to about 40% of the solid polyglycerol ester particles. Preferably, this mixture will comprise from about 80% to about 99% liquid nondigestible oil and from about 1% to about 20% of the solid polyglycerol ester particles, more preferably from about 85% to about 99% liquid nondigestible oil and from about 1% to about 15% of the solid polyglycerol ester particles, even more preferably from about 90% to about 99% liquid nondigestible oil and from about 1% to about 10% of the solid polyglycerol ester particles, and most preferably from about 95% to about 99% liquid nondigestible oil and from about 1% to about 5% of the solid polyglycerol ester particles. The use of higher levels of liquid nondigestible oil (i.e., lower levels of solid polyglycerol ester particles) may be desirable from the standpoint of reducing the waxiness impression left by the solid components of the nondigestible fat composition. However, higher levels of solid polyglycerol ester particles (i.e., lower levels of liquid nondigestible oil) may be desirable from the standpoint of controlling or preventing passive oil loss associated with the ingestion of compositions containing such liquid nondigestible oils.

The combination of liquid nondigestible oil and solid polyglycerol ester particles is typically formed by simply mixing the liquid and solid components together, by heating the mixture until the solid polyglycerol ester material dissolves in the oil and then by cooling the mixture to a suitable crystallization temperature, e.g., room temperature, which causes polyglycerol ester particles to form.

The specific size of the polyglycerol ester particles formed in the fat compositions herein will be dependent upon the rate at which the heated combination of oil and dissolved solid is cooled. As used herein, cooling rate is defined as the temperature differential between (a) the heated oil/dissolved solid combination and (b) the cooled crystallized liquid/solid particle combination, divided by the time taken to create this temperature differential. Generally the greater the cooling rate employed in forming the fat compositions herein, the smaller will be the particles of solid polyglycerol ester material dispersed in such compositions. Desirable cooling rates for use in forming the fat compositions herein are typically greater than 0.6° C./min. (1° F./min.), preferably greater than 2.8° C./min. (5° F./min.), more preferably greater than 5.6° C./min. (10° F./min.), and most preferably greater than 27.8° C./min. (50° F./min.). When the nondigestible fat compositions herein are to be formed in situ, for example, within a food product of which they form a part, then the type and concentration of the fat composition components should be selected so that the cooling profile experienced by the food product will result in formulation of the desired amount and size of the solid polyglycerol ester particles within the food product.

The formation of thin nondigestible particles according to the present invention provides especially efficient passive oil loss control for the resulting fat composition. Such efficiency permits a reduction in solids content of the nondigestible fat to relatively low levels (e.g., to from about 1% to about 15%). This reduction in solids levels required for passive oil loss control, together with the minimal/no change in solids between typical room and body temperatures, leads to nondigestible fats having a less waxy tasting impression.

Both the liquid nondigestible oil and the solid nondigestible polyglycerol ester components, as well as their respective concentrations, are selected in order to provide nondigestible fat compositions having certain physical characteristics. In the first place, the nondigestible fats of the present invention should exhibit a relatively flat Solid Fat Content (SFC) profile slope across the temperature range of from typical room temperature to body temperature, i.e. from 70° F. to 98.6° F. The SFC profile slope between these temperatures should be from 0 to about −0.75% solids/° F., preferably from 0 to about −0.5% solids/° F., more preferably from 0 to about −0.3% solids/° F., and most preferably from 0 to about −0.1% solids/° F. The method for determining the SFC profile slope of the compositions herein is described hereinafter in the Analytical Methods section.

The nondigestible fat compositions of the present invention should also exhibit particular Thixotropic Area Values. These Thixotropic Area Values are determined by a procedure which reflects the apparent viscosity and thixotropy of the nondigestible fat composition when it is crystallized by cooling according to the cooling profile that will be encountered when the fat is used in any given end use food product. For example, in the case of nondigestible fats of the present invention, this can approximate the cooling profile of a potato chip, and such a cooling profile will be typical of other deep fried salted snack products. Nondigestible fat compositions of the present invention should typically exhibit Thixotropic Area Values of about 10 kilopascals/second (kPa/sec) or greater, preferably about 25 kPa/sec or greater, more preferably about 45 kPa/sec or greater, even more preferably about 70 kPa/sec or greater, most preferably about 80 kPa/sec or greater. Thixotropic Area Values are determined by the method described hereinafter in the Analytical Methods section.

E. Food Products with Nondigestible Fat Compositions

The nondigestible fat compositions of the present invention can be used in various edible fat-containing products including foods, beverages and pharmaceuticals, either alone or in combination with other materials such as digestible fats and oils. In particular, the nondigestible fats of the present invention can be optionally formulated with a digestible triglyceride fat or oil. Generally, these formulations can comprise from about 10% to 100% nondigestible fat and from 0% to about 90% digestible triglyceride fat or oil. Preferably, these formulations comprise from 35% to 100%, more preferably from about 50% to about 100% and most preferably from about 75% to about 100% nondigestible fat, and from 0% to about 65%, more preferably from 0% to about 50%, and most preferably from 0% to about 25%, digestible triglyceride fat or oil. Because of the potential caloric impact of these triglyceride fats or oils, it is desirable to minimize the level at which they are combined with the nondigestible fats of the present invention.

As used herein, the term "triglyceride oil" refers to those triglyceride compositions which are fluid or liquid above about 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids may require partial or touch hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated, and filtered soybean oil is suitable, as well as refined cottonseed oil.

As used herein, the term "triglyceride fat" refers to those triglyceride compositions which are solid or plastic above about 25° C. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See Purves et al; U.S. Pat. No. 3,355,302; Issued Nov. 28, 1967, and Darragh et al; U.S. Pat. No. 3,867,556; Issued Feb. 18, 1975 (both incorporated herein by reference), for further examples of solid or plastic fats. Because the solid or plastic fats add an appreciable level of solids, their inclusion can cause adverse effects on the organoleptic properties, in particular waxiness, of the edible fat-containing products of the present invention.

Triglyceride fats and oils useful in the nondigestible fats of the present invention can include certain triglycerides in which one, two or three of the OH groups of the glycerol molecule have been substituted with acetyl, propionyl, butyryl, caproyl, caprylyl, or capryl radicals, and the remaining OH groups of the glycerol molecule (if any) have been substituted with acyl radicals of saturated or unsaturated fatty acids having from 12 to 24 carbon atoms.

The nondigestible fat compositions of the present invention can also be used in combination with reduced calorie medium chain and mixed medium/long chain triglycerides such as are disclosed in Ehrman et al; U.S. Pat. No. 4,888,196; Issued Dec. 19, 1989 and Seiden; European Patent Application 322,027; Published Jun. 28, 1989.

The nondigestible fat compositions of the present invention can be used in or as shortening and oil products. These shortening and oil products can be used in frying applications such as preparation of french fried potatoes, potato chips from potato slices or fabricated potato pieces, potato sticks, corn chips, tortilla chips, donuts, chicken, fish, and fried pies (e.g. turnovers). The shortening and oil products can also be used in preparing baked goods in any form, such as mixes, shelf-stable baked goods, and frozen baked goods, including, but not limited to, cakes, granola bars, brownies, muffins, bar cookies, wafers, biscuits, pastries, pies, pie crusts, and cookies, including sandwich cookies, chocolate chip cookies, particularly storage stable dual-texture cookies as disclosed in Hong et al; U.S. Pat. No. 4,455,333; Issued Jun. 19, 1984. These baked goods can contain fruit, cream, or other fillings. Other baked good uses include breads and rolls, crackers, pretzels, pancakes, waffles, ice cream cones and cups, yeast-raised bake goods, pizza and pizza crust, and baked farinaceous snack products and other baked salted snacks.

Other edible fat-containing products which contain the nondigestible fat compositions of the present invention include ice cream, frozen desserts, cheese, cheese spreads, meats, meat analogs, chocolate confections, salad dressings, mayonnaise, margarine, spreads, sour cream, yogurt, coffee creamer, peanut butter, extruded snacks such as corn curls, corn puffs, pellet snacks, half products and other extruded snacks based on corn or other cereal grains such as wheat, rice and the like, roasted nuts and beverages such as milkshakes.

Edible fat-containing products according to the present invention can include noncaloric or reduced calorie sweeteners alone or in combination with bulking agents. These noncaloric or reduced calorie sweeteners include, but are not limited to, aspartame, saccharin, alitame, thaumatin, dihydrochalcones, acesulfame, and cyclamates.

Bulking or bodying agents which can be useful in edible fat-containing products containing the nondigestible fat compositions herein include partially or wholly nondigestible carbohydrates, for example, polydextrose and cellulose or cellulose derivatives, such as D,L-sugars, carboxymethylcellulose, carboxyethylcellulose, hydroxypropylcellulose, methylcellulose, hydroxypropyl methylcellulose, and microcrystalline cellulose. Other suitable bulking agents include gums hydrocolloids), starches, dextrins, fermented whey, tofu, maltodextrins, polyols, including sugar alcohols, e.g., sorbitol and mannitol, and carbohydrates, e.g., lactose.

The edible fat-containing products containing the nondigestible fat compositions herein can also include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and manmade fibers (for example, by bacterial synthesis). Commercial fibers such as purified plant cellulose, or cellulose flour, can also be used. Naturally occurring fibers can be used, such as psyllium and fibers from whole citrus peel, citrus albedo, sugar beets, citrus pulp and vesicle solids, apples, apricots, and watermelon rinds.

These dietary fibers can be in a crude or purified form. The dietary fiber used can be of a single type (e.g., cellulose), a composite dietary fiber (e.g., citrus albedo fiber containing cellulose and pectin), or some combination of fibers (e.g., cellulose and a gum). The fibers can be processed by methods known to the art.

The nondigestible fat compositions of the present invention can also be fortified with vitamins and minerals, particularly the fat-soluble vitamins. The fat-soluble vitamins include vitamin A, vitamin D, and vitamin E and their precursors. See Mattson; U.S. Pat. No. 4,034,083; Issued Jul. 5, 1977 (herein incorporated by reference) which discloses fat-soluble vitamins useful in fortifying polyol fatty acid polyester.

Various other ingredients typically present in fat products can also be included in the nondigestible fat compositions of the present invention. These other ingredients include stabilizers to help protect against oxidative deterioration at high temperatures. Silicone oils, particularly methyl and ethyl silicone oils, are useful for this purpose. Methyl silicones have also proven effective in reducing the rate of polymerization during frying. Other additives typically included in fat products such as minor amounts of optional flavorings, emulsifiers, anti-spattering agents, anti-sticking agents, anti-oxidants or the like can also be present.

F. Alternate Utility for the Solid Polyglycerol Ester Particles

It has been found that the solid polyglycerol ester particles useful as passive oil loss control agents in the nondigestible fat compositions herein, are also effective for use as thickening agents in conventional digestible triglyceride oils or oil-containing products. Accordingly, these solid polyol polyester particles can be used as "thickening agents" or "hardstocks" by blending them in amounts of about 1% to about 40% (typically 1% to 15%, more typically 1% to 10%, and most typically 1% to 8%) with liquid digestible oils in the formulation of cooking and salad oils or semi-solid food products such as shortenings, as well as other food products which contain a combination of fat and non-fat ingredients, e.g., margarines, mayonnaise, frozen dairy desserts and the like. The oils for these compositions can comprise conventional digestible triglyceride oils such as cottonseed, corn, canola or soybean, or medium or medium and long chain triglycerides.

G. Analytical Methods

A number of parameters used to characterize elements of the present invention are to be quantified by experimental analytical procedures. Each of these procedures is described in detail as follows:

1. Fatty Acid Composition of Polyol Polyesters

The fatty acid composition (FAC) of the polyol polyesters is determined by gas chromatography, using a Hewlett-Packard Model S712A gas chromatograph equipped with a flame ionization detector and a Hewlett-Packard Model 7671A automatic sampler.

The method is applicable to methyl esters of fatty acids having 8 to 24 carbon atoms and to animal fats, vegetable oils, marine oils and fatty acids after their conversion to methyl esters. The method permits quantitative separation of mixtures containing saturated and unsaturated methyl esters. The conditions specified in this method are not suitable for determining epoxy or oxidized fatty acids or fatty acids that have been polymerized.

Apparatus 1.

1. The gas chromatograph, which is commercially available, should have as a minimum the following characteristics (a) Column oven, capable of heating the column to at least 220° C. and of maintaining the desired temperature to within ±1° C.

(b) Sample inlet port with minimum dead space which is independently heated to a temperature 20°–50° C. higher than column temperature.

(c) Detectors, thermal conductivity (TC) or flame ionization (FID), separately thermostated, which can be maintained at or above column temperature.

2. Recorder—If the recorder curve is to be used to calculate the composition of the mixture analyzed, an electronic recorder of high precision is required. The characteristics of the recorder should be (a) Rate of response below 1.0 seconds (the rate of response is the time taken for the recording pen to pass from 0 to 90 percent following the momentary introduction of a 100 percent signal).

(b) Chart paper width, 25 cm (10 inches) minimum.

(c) Chart paper speed, 25–100 cm/hr (10–40 inches/hour).

3. Integrator or Calculator (optional)—Rapid and accurate calculation can be performed with the help of an electronic integrator or calculator. This must give a linear response with adequate sensitivity, and baseline correction should be consistent with good chromatographic practice. Horizontal, non-horizontal and tangential baseline correction must be controlled by selectable electronic peak logic.

4. Syringe, maximum capacity 10 $\mu$L, graduated in 0.1 $\mu$L.

5. Chromatographic Column (a) The column must be constructed of a material inert to the substances to be analyzed, glass, or failing that, stainless steel (see Notes, 1), with a length of 1 to 3 m and an internal diameter of 2 to 4 mm.

(b) Packing support, acid-washed and silanized diatomaceous earth, or other suitable inert support with a narrow range (25 $\mu$m) of grain size between the limits of 60–120 mesh (125–250 $\mu$m).

(c) Stationary phase, polyester type of polar liquid (diethylene glycol polysuccinate, butanedial polysuccinate, ethylene glycol polyadipate), or any liquid (e.g., cyanosilicones), meeting the requirements below. The stationary phase should amount to 5–20 percent of the packing. A nonpolar stationary phase, such as methyl silicone, fluid or gum, can be used for separations of fully saturated materials.

Reagents:

1. Gases (a) Carrier gas for TC detector, helium, minimum purity 99.95 mol %; for FID, helium, nitrogen, or argon, minimum purity 99.95 mol %.

(b) FID, hydrogen, minimum purity 99.95 mol %; air, dry (dew point −75F maximum) and hydrocarbon free (less than 2 ppm hydrocarbons equivalent $CH_4$).

2. References Standards—A mixture of methyl esters, or the methyl esters of an oil of known composition, preferably similar to that of the fatty matter to be analyzed. Reference mixtures simulating most fats and oils may be obtained from Applied Science Laboratories, Inc., PO Box 440, State College, Pa. 16801. Supelco, Inc., Supelco Park, Bellefonte, Pa. 16823. Nu Chek Prep, Inc., PO Box 172, Elysian, Minn. 56028. Analabs, Inc., 80 Republic Drive, North Haven, Conn. 06473. Alltech Associates, Inc., 2501 Waukegan Road., Deerfield, Ill. 60015.

Preparation of Methyl Esters:

AOCS Official Method Ce 2-66 is recommended.

Procedure:

1. Conditioning a new column while disconnected from detector by holding it about 10° C. above its operating temperature with flow of inert gas at 20–60 mL/min. for approximately 16 hours and then an additional 2 hours at 20° C. above its operating temperature. In no case exceed the manufacturer's recommended maximum temperature.

2. Determining optimal operating conditions (a) In selecting the test conditions, the following variables must be taken into account: length and diameter of the column, temperature of the column, carrier gas flow, resolution required, size of the sample for analysis and time of analysis. The size of the sample should be chosen so that the assembly of detector and electrometer gives a linear response. As a rule, the following figures will lead to the desired results, viz., at least 2,000 theoretical plates for methyl stearate and its elution within about 15 minutes:

| Internal Diameter of Column | Carrier Gas Supply |
|---|---|
| 2 mm | 15–25 ml/min |
| 3 mm | 20–40 ml/min |
| 4 mm | 40–60 ml/min |

| Concentration of Stationary Phase | Temperature |
|---|---|
| 5 percent | 175° C. |
| 10 percent | 180° C. |
| 15 percent | 185° C. |
| 20 percent | 185° C. |

(b) Where the apparatus allows, the injection port should be at a temperature of about 250°–275° C. and the detector at a temperature equal to, or higher than, that of the column.

(c) The flow of hydrogen to the flame ionization detector is, as a rule, about 0.5 to 1 times that of the carrier gas, and the flow of air about 5 to 10 times that of the hydrogen.

3. Determining the efficiency and the resolution (a) Carry out the analysis of a mixture of methyl stearate and oleate in about equivalent proportions (e.g., methyl esters from cocoa butter). Choose the size of the sample, the temperature of the column and the carrier gas flow so that the maximum of the methyl stearate peak is recorded about 15 minutes after the solvent peak and rises to three-quarters of the full scale. Calculate the number of theoretical plates n (efficiency) by the formula $$n=16(dR_1/w_1)^2$$

and the resolution, R, by the formula $$R=2\Delta/(w_1+w_2)$$

where dR1 is the retention distance, measured in mm, from the start to the maximum peak of methyl stearate.

w1 and w2 are the widths, in mm, of the peaks for methyl stearate and methyl oleate, measured between the points of intersection of the tangents at the inflection points of the curve with the base-line.

$\Delta$ is the distance between the respective peak maxima for methyl stearate and oleate.

(b) Operating conditions to be selected are those which will afford at least 2,000 theoretical plates for methyl stearate, and a resolution at least 1.25. Additionally, linolenic acid ($C_{18:3}$) ester should be separable from archidic acid ($C_{20:0}$) and gadoleic acid ($C_{20:1}$) esters.

(c) As a rule, the operating conditions will be those defined above. Nevertheless, it is possible to work with a lower column temperature where the determination of acids below $C_{12}$ is required, or at a higher temperature when determining fatty acids above $C_{20}$.

(d) On occasion, it is possible to employ temperature programming in both the previous cases. For example, if the sample contains the methyl esters of fatty acids below $C_{12}$, inject the sample at 100° C. column temperature and immediately raise the temperature at a rate of 4–8° C./minute to the optimum. In some cases, the two procedures can be combined. After the programmed heating, continue the elution at a constant temperature until all the components have been eluted. If the instrument does not employ programmed heating, work at two fixed temperatures between 100° C. and 195° C. Liquid phase characteristics will determine the starting temperature or the upper temperature if the analysis is performed iso-thermally.

4. Analysis (a) The sample for examination should be 0.1–2 $\mu$L of the solution of methyl esters obtained according to AOCS Official Method Ce 2-66. In the case of esters not in solution, prepare an approximate 1–10% solution and inject 0.1–1 $\mu$L of this solution.

(b) If the object is to determine constituents present only in trace amounts, the sample size may be increased (up to tenfold).

Calculations:

1. Identification of Peaks (a) Analyze the reference standard mixture of known composition under the same operating conditions as those employed for the sample, and measure the retention distances (or retention times) for the constituent esters. Construct graphs showing the logarithm of the retention distance (or retention time) as a function of the number of carbon atoms of the acids; under iso-thermal conditions, the graphs for straight chain esters of the same degree of unsaturation should be straight lines. These straight lines are approximately parallel.

(b) Identify the peaks for the sample from these graphs, by interpolation if necessary.

(c) It is necessary to avoid conditions which permit masked peaks, i.e., where the resolution is not adequate to separate two components.

2. Quantitative Analysis (a) Apart from exceptional cases, assume that the whole of the components of the sample are represented on the chromatogram, so that the total of the areas under the peaks represents 100% of the consistuents (total elution).

(b) If the equipment includes an integrator, use the figures obtained therefrom. If not, determine the area under each peak by multiplying the height by the breadth at mid-height and, where necessary, take into account the various attenuations used during the recording.

(c) For the general case, in which significant amounts of components below $C_{12}$ are absent, calculate the content of a particular constituent (expressed as percent of methyl esters) by determining the percentage represented by the area of the corresponding peak relative to the sum of the areas of all the peaks.

Area percent of the component i expressed as methyl ester=

$$\frac{A_i}{\sum A_i} \times 100$$

Where $A_i$=area of the peak corresponding to component i.
$\sum A_i$=sum of the areas under all the peaks.

(d) Correction factors, particularly in the presence of acids below $C_{12}$, of acids with secondary groups, or when using a TC detector, must be used to convert the percentages of peak areas into mass-percentages of the components. Determine the correction factors with the help of a chromatogram derived from the analysis of a reference mixture of methyl esters of known composition under operating conditions identical with those used for the sample.

For this reference mixture:
Weight percent (m/m) of component i=

$$\frac{B_i}{\sum B_i} \times 100$$

Where $B_i$=mass of component i in the reference mixture
$\sum B_i$=total of the masses of the various components of the reference mixture From the chromatogram of the reference mixture, one can calculate:

$$\text{Area percent of component } i = \frac{C_i}{\sum C_i} \times 100$$

Where $C_i$=area under the peak corresponding to component i
$\sum C_i$=sum of the area under all the peaks.
Whence $$\text{Correction factor } K_i = \frac{B_i \times \sum C_i}{C_i \times \sum B_i}$$

Commonly, the correlation factors are made relative to $K_{C16}$ so the relative factors become:

$$K'_i = \frac{K_i}{K_{C16}}$$

Then the content of each component in the sample is given by:
Weight percent (n/m) of component i, expressed as methyl esters=

$$\frac{(K'_i \times A_i)}{\sum (K'_i \times A_i)} \times 100$$

(e) Use an internal standard, notably in determinations when all of the fatty acids are not eluted. The internal standard may be the methyl ester of the $C_{13}$ fatty acid. The correction factor for the internal standard should be determined:

Weight percent (n/m) of component i, expressed as methyl esters=

$$\frac{m_{C_{13}} \times K'_i \times A_i}{m \times K'_{C_{13}} \times A_{C_{13}}} \times 100$$

Where $m_{C13}$=mass, in mg, of the internal standard added to sample
m=mass, in mg, of the sample
*$K'_{C13}$=correction factor for the internal standard relative to $K_{C16}$
$A_{C13}$ =area of the peak corresponding to the internal standard
$A_i$=area of the peak corresponding to component i
$K'_i$=correction factor of component i relative to $K_{C16}$ $$*K'_{C_{13}} = \frac{K_{C_{13}}}{K_{C_{16}}}$$

*Determined be adding a known amount $C_{13}$ methyl ester to the reference mixture and then following the above procedure for determining $K'_i$.

(f) Expression of the results

Give the results to: 3 significant figures for contents over 10%, 2 significant figures for contents between 1 and 10 percent, 1 significant figure for contents below 1 percent, i.e., with one figure beyond the decimal point in every case.

Precision:

1. Repeatability—The difference between the results of two determinations carried out on the same day by the same operator using the same apparatus for the same esters and for constituents present in excess of 5% should not exceed a relative figure of 3% of the determined value, with an absolute value of 1%. For components present in amounts of less than 5%, the repeatability in relative terms diminishes progressively as the content is reduced.

2. Reproducibility—The difference between the results obtained in two different laboratories for constituents present in excess of 5% should not exceed a relative figure of 10% of the determined value, with an absolute maximum of 3%. For constituents present in amounts less than 5%, the reproducibility in relative terms diminishes progressively as the content is reduced.

Notes:

1. If polyunsaturated components with more than three double bonds are present, they may decompose in a stainless-steel column.

2. It is recommended that chromatographers read "Standard Recommended Practice for General Gas Chromatography Procedures", ASTM Designation E260-73; "Standard Recommended Practice for Gas Chromatography Terms and Relationships", ASTM Designation E355-77; and "Standard Recommended Practice for Testing Flame Ionization Detectors Used in Gas Chromatography", ASTM Designation E594-77.

2. Ester Distribution of Sucrose Polyesters

The relative distribution of the individual octa-, hepta-, hexa- and penta- esters, as well as collectively the tetra-through mono- esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

3. Slope of Solid Fat Content (SFC) Profile of Nondigestible Fat Measured in ° F.

Before determining the SFC values, a sample of the nondigestible fat is heated to a temperature of 140° F. (60° C.) or higher for at least 30 minutes or until the sample is completely melted. The melted sample is then tempered as follows: at 80° F. (26.7° C.) for 15 minutes; at 32° F. (0° C) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37° C.) are determined by pulsed nuclear magnetic resonance (PNMR) after equilibration for 30 minutes at each temperature. The slope of the SFC profile in % solids/° F. is calculated by subtracting the SFC value at 70° F. (21.1° C.) from the SFC value at 98.6° F. (37° C.) and then dividing by 28.6. The method for determining SFC values by PNMR is as follows:

Apparatus:
1. Praxis Pulsed NMR SFC 900 Solid Fat Analyzer available from The Praxia Corporation, San Antonio, Tex., 78251, or equivalent.
2. Sample tubes. Test tubes, culture, disposable, Pyrex or Kimax glass, 10 mm OD×75 mm length without rims, with dimensions 0.380±0.005 inches OD (9.65±0.13 mm OD).
3. Oven maintained at 70° C.±2° C.
4. Corks, size 0.
5. Tissues for wiping sample tubes.

Reagents:
Olive oil reference liquids having the following compositional analysis (see Notes, 2)

|  | Spanish | Italian |
|---|---|---|
| Iodine Value: | 84–87 | 85–88 |
| Saponification Value: | 189–195 | 192–195 |
| Fatty Acid Composition |  |  |
| $C_{16}$ | 9.5 ± 1.0 | 14.0 ± 1.5 |
| $C_{18}$ | 3.5 ± 0.5 | 2.5 ± 0.5 |
| $C_{18:1}$ | 76 ± 2.0 | 65.0 ± 3.0 |
| $C_{18:2}$ | 7.0 ± 1.5 | 14.0 ± 1.5 |
| $C_{18:3}$ | 1.0 ± 0.2 | 1.0 ± 0.2 |

Procedure:
1. Filling the sample tubes
   (a) Heat the sample in the 70° C. oven until liquid and mix well.
   (b) Fill the sample tube with the melted sample to approximately 15 mm from the top.
   (c) Place cork in top of sample tube.
   (d) Wipe sample tube with tissue making sure outside of tubes are clean.
2. Tempering of the sample and pulsed nmr measurements 10
   (a) Insert sample tubes containing all samples to be measured and the reference olive oil sample into the sample tempering ports of the 60° C. probe.
   (b) Equilibrate all samples and reference oil for 30 minutes.
   (c) Set the instrument conditions as follows

| Auto/Manual Switch | Auto |
|---|---|
| Probe/Selector | 6 |
| FID/Temp Switch | FID |
| Response | Fast |
| Variable Delay | 100 × 1 |
| Clock | 2 × 1.0 |
| Function | 90° C. |
| Program Counter | 8 |
| Gain and Instrument | Refer to Operators |
| Background | Manual |
| Probe Temperatures | Refer to Operators Manual |

(d) Insert the olive oil reference sample into the analysis port and measure the NMR reading (see Notes, 3).
   (e) Insert each sample into the analysis port and measure the NMR reading of each sample.
   (f) Transfer the reference oil and samples to the 26.7° C. probe and equilibrate for exactly 15 minutes.
   (g) Transfer the reference oil and samples to the 0° C. probe and equilibrate for exactly 15 minutes.
   (h) Transfer the reference oil and samples to the 26.7° C. probe and temper for exactly 30 minutes.
   (i) Transfer the reference oil and samples to the 0° C. probe and chill for exactly 15 minutes.
   (j) Transfer the reference oil and samples to the 10° C. probe and equilibrate for exactly 30 minutes.
   (k) Set clock to 1×1.0 an Probe Selector to 1.
   (l) Measure the NMR reading of the reference oil and samples.
   (m) Transfer the reference oil and samples to the 21.1° C. probe and equilibrate for exactly 30 minutes.
   (n) Set Probe Selector to 2.
   (o) Measure the NMR reading of the reference oil and the samples.
   (p) Transfer the reference oil and samples to the 26.7° C. probe and equilibrate for exactly 30 minutes.
   (q) Set Probe Selector to 3.
   (r) Measure the NMR reading of the reference oil and the samples.
   (s) Transfer the reference oil and samples to the 33.3° C. (or to 40.6° C.) probe and equilibrate for exactly 30 minutes.
   (t) Set Probe Selector to 4.
   (u) Measure the NMR reading of the reference oil and samples.
   (v) Transfer the reference oil and samples to the 37.8° C. (or to 40.6° C.) probe and equilibrate for exactly 30 minutes.
   (w) Set Probe Selector to 5.
   (x) Measure the NMR reading of the reference oil and samples.

Calculations:
1. Solid Fat Content (SFC) at temperature TC=

$$\frac{\text{Reference oil at } 60° \text{ C.}}{\text{Sample at } 60° \text{ C.}} \times \frac{\text{Sample at TC}}{\text{Reference Oil TC}} \times 100$$

Example:

NMR Readings:
Reference Oil at 60° C.     105.6
Sample at 60° C.            105.4
Reference Oil at T ° C. (10.0)  98.8
Sample at T ° C. (10.0)      80.2

$$\% \text{ Solid Fat} = 100 - \frac{105.6}{105.4} \times \frac{80.2}{98.8} \times 100 = 18.67\%$$

Precision:

Data from the AOCS collaborative study which validated this method show the following reproducibility can be expected 1. Within and between laboratories, separate determinations of margarine-type oils should be plus or minus one standard deviation for temperatures listed:

|  | 10.0° C. | 21.1° C. | 26.7° C. | 33.3° C. | 37.8° C. |
|---|---|---|---|---|---|
| Std. dev. | 0.6 | 0.5 | 0.6 | 0.6 | 0.4 |

2. Within and between laboratories, separate determinations of plasticized shortening-type oils should be plus or minus one standard deviation for temperatures listed:

|  | 10.0° C. | 21.1° C. | 26.7° C. | 33.3° C. | 37.8° C. |
|---|---|---|---|---|---|
| Std. dev. | 0.7 | 0.7 | 0.6 | 0.5 | 0.4 |

3. Within and between laboratories, separate determination of non-cocoa butter-type confectionery fats should be plus or minus one standard deviation for temperatures listed:

|  | 10.0° C. | 21.1° C. | 26.7° C. | 33.3° C. | 37.8° C. |
|---|---|---|---|---|---|
| Std. dev. | 0.6 | 1.0 | 1.1 | 0.5 | 0.4 |

4. Within and between laboratories, separate determinations for unhydrogenated palm-type oils should be plus or minus one standard deviation for temperatures listed (see Notes, 4):

|  | 10.0° C. | 21.1° C. | 26.7° C. | 33.3° C. | 37.8° C. |
|---|---|---|---|---|---|
| Std. dev. | 1.0 | 0.8 | 0.6 | 0.5 | 0.4 |

5. Within and between laboratories, separate determinations tristearin in olive standards should be plus or minus one standard deviations at 10° C. for the percent tristearin in olive oils listed (see Notes, 5):

|  | 10.0° C. | 21.1° C. | 26.7° C. | 33.3° C. | 37.8° C. |
|---|---|---|---|---|---|
| Std. dev. | 0.2 | 0.2 | 0.4 | 0.2 | 0.1 |

Notes:

1. The basic procedure described is applicable at temperatures and times other than those specified and the Committee recognizes that sometimes such deviations are necessary. In 1989, a collaborative study effort by the AOCS NMR Technical Committee was begun to establish harmonized tempering conditions for existing NMR instruments and for other types of fats and oils. The Committee expects this study to be completed in 1991.

2. The basic procedure described is dependent upon the chemical stability of the olive oil reference sample. Excessive heating or abuse can cause oxidation resulting in the formulation of solids and lower pulsed NMR readings. The Committee recommends replacement of the reference sample oil every three months with fresh olive oil which has been kept under refrigeration. While it is not the Committee's place or intent to recommend a specific oil, it is noted that the collaborative study was conducted using a high grade Lucca Olive Oil from Italy.

3. Push retest button one time before making NMR reading on first sample tested in each probe, as recommended by the Instrument Manufacturer.

4. The basic procedure described is applicable to unhydrogenated palm oils and blends containing unhydrogenated palm oils. The Committee recognized that other palm oil type samples and/or blends do produce poor reproducibility and further work is planned in this direction to establish tempering conditions prior to measurement.

5. These values of reproducibility are an indication of the precision obtainable by this method of measurement when polymorphic stability of the sample is not a factor. The tristearin in olive oil mixtures are also used as reference samples for the calibration of the instrument. These mixtures are melted and liquid readings taken at 70° C. before being tempered and measured by this method. The Solid Fat Content (SFC) values measured agree well with the percentage of solids by weight. A single fifth order polynomial regression equation is recommended for solids contents of 95% or less. Polynomial coefficients, correlation coefficients and interpolation tables for conversion of calculated solids to calibration corrected solids can be obtained from the manufacturer for each instrument.

The calibration procedure is also provided by the manufacturer.

4. Complete Melting Point of Polyol Polyesters by Differential Scanning Calorimetry (DSC)

The complete melting point of the polyol polyester material or polyol polyester-containing particles used in this invention can be determined by DSC as follows:

Equipment:

Perkin-Elmer 7 Series Thermal Analysis System, Model DSC7, manufactured by Perkin-Elmer, Norwalk, Conn.

Procedure:

1. Sample of polyol polyester material or polyol polyester-containing blend is heated to at least 10° C. above the temperature at which all visible solids are melted and mixed thoroughly.

2. 10±2 mg of sample is weighed into sample pan.
3. A scan is performed from about 10° C. above the temperature at which all visible solids are melted to 60° C. at 5° C. per minute.
4. The temperature of the sample is maintained at −60° C. for 3 minutes and scanned from −60° C. to the original starting temperature at 5° C. per minute (i.e., to about 10° C. above the temperature at which all visible solids are melted).
5. The complete melt point is the temperature at the intersection of the base line (i.e. specific heat line) with the line tangent to the trailing edge of the last (e.g., highest temperature) endothermic peak.

5. Thixotropic Area Value

The nondigestible fat compositions of the present invention exhibit certain rheological characteristics (i.e. apparent viscosity and thixotropy) which correlate to the extent of passive oil loss control that such compositions provide. The method described herein may be used to determine the Thixotropic Area Value of a fat composition wherein the solid component has crystallized via the cooling profile of the end-use product to form a three-dimensional, solid-like structure.

Thixotropic Area can be expressed in terms of the dimensions of energy per unit volume of sample being sheared, which is an indication that energy is required to break down the three-dimensional, solid-like structure of the material. (See Schram, G. *Introduction to Practical Viscometry*, (1981), pp. 17–19, Gebruder Haake, West Germany.) Thus, Thixotropic Area may be considered a relative measurement of the three-dimensional, solid-like network of the fat composition that exists prior to shearing. In this method, shear stress is measured as a function of shear rate between $0s^{-1}$ and $800\ s^{-1}$ using a cone and plate rheometer. The shear rate is first increased for 7.5 minutes and then decreased for 7.5 minutes at 37.8° C. The Thixotropic Area is the area of the hysteresis between the ascending and descending flow curves. Nondigestible fat compositions which have Thixotropic Area Values of at least about 10 kPa/sec will exhibit passive oil loss control when ingested.

a) Calibration of Recorder

A cooling profile template (see FIG. 1) is placed on an X-Y recorder (Houston Instruments Model 200) so that time is the X-axis. The cooling profile used should approximate that of the end-use product. In this case, the cooling profile used is an approximation of the cooling profile of a potato chip and is typical of all deep fat fried salted snack products. The recorder switches are set to the parameters described on the template and then calibrated in the following manner:

1. Calibrator set to 50 mv.
2. ZERO potentiometer adjusted until pen indicates 50° F. on recorder.
3. Calibrator is set to 190 mv.
4. SPAN potentiometer is adjusted until pen indicates 190° F. on recorder.

The above steps 1–4 are repeated until the pen indicates the proper temperature without adjustment. The strip chart recorder is then attached to the analog output of a thermocouple reader (Omega #199A).

b) Sample Preparation

A nondigestible fat sample is heated above 180° F. until completely melted and then thoroughly mixed. Eight (8) grams of the sample are then weighed into an aluminum weighing pan (VWR Scientific #25433-008). A thermocouple (Omega #5TC-T-36-36 0.005 inch type T) is submerged in the sample in approximately the center of the pan, care being taken to keep the thermocouple tip from touching the bottom of the pan. The pan is then placed on a hot plate and heated to approximately 240° F. (240° is the estimated surface temperature of a potato chip after it is removed from the fryer). This temperature may have to be adjusted to approximate the cooling profile of the particular end-use product into which the fat composition being tested will eventually be incorporated. When the appropriate temperature is reached, the recorder is started and the pan is removed from the hot plate and placed on top of a lab bench. The temperature of the sample is controlled so as to approximately track (±5°) the cooling curve shown on the template. This is achieved by providing gentle agitation to the pan to accelerate cooling and removing of the pan from the lab bench top to slow the cooling rate. This cooling process takes approximately 3 minutes to complete, after which time the thermocouple is removed. The nondigestible fat sample is then tempered for at least 30 minutes at a temperature which is typical of the storage temperature generally encountered by the end-use product into which the nondigestible fat sample will eventually be incorporated (e.g. 70° F. for a potato chip) prior to measurement of the thixotropic area.

c) Rheometer Setup

The rheometer (Contraves Rheomat 115A with 2, 5 and 7 cm cones; 2° angle) is interfaced with a computer and set up under the following conditions:

Program Setup

| | | |
|---|---|---|
| Sensitivity | 1.0 | |
| First minimum shear rate (s-1) | 0.000 | |
| Time at minimum shear rate (s) | 120.0 | Hold time to allow sample temperature equilibration |
| Ascending ramp time (s) | 450.0 | 7.5 minute scan 0 to 800 s-1 |
| Maximum shear rate (s-1) | 800.000 | |
| Hold time (s) | 1.0 | |
| Second minimum shear rate (s-1) | 0.000 | |
| Descending ramp time (s) | 450.0 | 7.5 minute scan 800 to $0s^{-1}$ |

Data Output Conditions

Printout of measured points 1 to 15
Calculate Thixotropic Area
Printout results d) Cone Selection Using a CP-8 (2 cm) cone, measure the Thixotropic Area of the sample according to this method. If the Thixotropic Area Value is greater than 200 kPa/s, maximum accuracy has been attained. If the Thixotropic Area Value is between 50 and 200 kPa/s, the method should be repeated using a CP-6 (5 cm) cone. If the Thixotropic Area Value is between 0 and 50 kPa/s, the method should be repeated using the CP-10 (7 cm) cone.

e) Torque Calibration

The rheometer is calibrated for torque by lifting the measuring head away from the plate and then adjusting the torque calibration knob on the control panel of the rheometer until the torque meter to the left of the adjustment knob reads "+000" with the "+" flashing.

f) Temperature Calibration

The temperature of the sample during analysis should be maintained at 37.8±0.1° C. After setting the recirculating bath to achieve approximately 37.8° C., the plate temperature is checked by applying a small amount of oil to the plate, positioning the cone onto the plate, inserting the thermocouple probe into the gap between the cone and the plate, and then allowing a few minutes for the temperature to equilibrate. The temperature is then read with the bath temperature being adjusted until the plate temperature is 37.8±0.1° C.

g) Sample Analysis Approximately 4 grams of the tempered nondigestible fat sample is applied to the rheometer plate. The cone assembly is then lowered slowly onto the sample and seated firmly on the plate. At this point, the flow curve program is initiated. Upon completion of the run, a report is printed out listing the first 15 data points on the flow curve and the calculated thixotropic area. The Thixotropic Area is the hysteresis area between the ascending and descending flow curves and is reported as the Thixotropic Area Value (Kpa/sec.).

6. Average Degree of Glycerol Polymerization

The "average degree of glycerol polymerization" (n-bar) is a molar quantity which describes the the average number of glycerol moieties in the polyglycerol ester species comprising a polyglycerol ester mixture. The average degree of glycerol polymerization is calculated from an experimentally determined distribution of the weight percentages of the individual polyglycerol ester species which make up a given mixture of polyglycerol esters.

The distribution of polyglycerol ester species in a polyglycerol ester sample can be determined as follows: the polyglycerol ester sample is transesterified with sodium methoxide in refluxing methanol. The sodium methoxide is removed from the resulting solution by treatment with an anion exchange resin. The methanolic solution of polyglycerols and resulting methyl esters is extracted with hexane to remove the methyl esters. Finally, the methanol is evaporated, leaving the mixture of unesterified polyglycerols. The polyglycerols thus obtained are derivatized with a 5/1 (by volume) mixture of trimethylsilyl- imadazole and bis(trimethylsilyl)trifluoroacetamide in pyridine to form trimethylsilyl ethers. The sample is analyzed by GC using a short (18 inches by ⅛ inch ID), packed column (3% JXR on 100/120 mesh Gas Chrom Q), on column injection and flame ionization detection. The GC method is essentially that used for the separation of intact mixtures of mono-, di-, and triglycerides described in JAOCS, 58, (1981) pages 215–227.

The average degree of glycerol polymerization (n-bar) can then be calculated from the determined distribution of polyglycerol species in the sample according to the following equation:

$$n-\text{bar} = \frac{\sum_{n=1}^{\infty} n \times \frac{\text{Wt \% } G_n}{\text{MW}_{G_n}}}{\sum_{n=1}^{\infty} \frac{\text{Wt \% } G_n}{\text{MW}_{G_n}}}$$

where Wt % $G_n$ = weight % in the sample of a polyglycerol species having $n$ repeating units $\text{MW}_{G_n}$ = the molecular weight of a polyglycerol ester species having $n$ repeating units = $n(74) + 18$ 7. % Esterification of Polyglycerol Ester Mixture The % esterification of a polyglycerol ester sample is the average degree of polyglycerol esterification expressed on a mole percent basis. The % esterification is calculated indirectly from the Saponification Value, the Acid Value and the average degree of glycerol polymerization of a polyglycerol ester sample. The analytical methods for determining the Saponification Value and the Acid Value of a polyglycerol ester sample are as follows:

Saponification Value

The solid polyglycerol ester sample can be saponified with refluxing alcoholic KOH according to the procedure described in *Official Methods and Recommended Practices of the American Oil Chemists Society*, 4th Ed., 1989, Procedure Cd 3-25. The resulting fatty acid soaps are titrated with standardized HCl to a phenolphthalein endpoint. A blank (no sample added) is also run through the procedure and titrated.

The Saponification Value can then be calculated according to the following equation:

$$SV=((B-S)\times N\times 56.1)/W$$

Where

B=volume (mls) HCl required to titrate the blank

S=volume (mls) HCl required to titrate the sample

N=normality of the HCl

W=sample weight in grams

Acid Value

The solid polyglycerol ester sample can be titrated with standardized KOH to a phenolphthalein endpoint. The procedure is described in *Official Methods and Recommended practices of the American Oil Chemists Society*, 4th Ed., 1989, Procedure Cd 3a-63. A blank (no sample added) is titrated also.

The Acid Value can then be calculated according to the following equation:

$$AV=((A-B)\times N\times 56.1)/W$$

where

A=volume in mls of KOH required to titrate the sample

B=volume in mls of the KOH required to titrate the blank

N=normality of the KOH

W=sample weight in grams

From the Saponification Value and the Acid Value, the "Ester Value" (EV) of the polyglycerol ester sample can then be calculated. The Ester Value of a given polyglycerol ester sample is the difference between the saponification value (SV) and the acid value (AV) of the sample.

From the Ester Value, a Corrected Ester Value can then be calculated. The "Corrected Ester Value" ($EV_{cor}$) of a given polyglycerol ester sample is the calculated ester value of a pure sample containing only the polyglycerol esters (i.e., containing no free fatty acid). Corrected Ester Value is calculated according to the following equation:

$$EV_{cor} = \frac{EV}{1 - \frac{\% ffa}{100}}$$

where % $ffa = AV(0.503)$

Next, an average degree of esterification (i-bar) is calculated from the corrected ester value and the average molecular weight of the polyglycerol ($MW_{Gn\text{-}bar}$). The average degree of esterification (i-bar) is a molar quantity which describes the average number of the hydroxyl groups of the polyglycerol ester sample which are esterified with fatty acids. Thus, $$i-\text{bar} = \frac{(EV_{cor})(MW_{Gn\text{-}bar})}{56,000 - (EV_{cor})(\text{avg. } MW_{fa} - 18)}$$

where $$MW_{Gn-bar} = \text{n-bar}(74) + 18$$

avg. $MW_{fa}$=the average molecular weight of the fatty acid ester groups (fa) present in the polyglycerol ester sample calculated from the weight percent fatty acids of the various species as measured by the GCFAC method hereinbefore described according to the equation:

$$\text{avg. } MW_{fa} = \sum \frac{\text{wt \% } fa\ MW_{fa}}{100}$$

Lastly, the % esterification is calculated according to the following equation:

$$\% \text{ esterification} = \frac{(i\text{-bar})100}{n\text{-bar} + 2}$$

8. Digestibility of Fat Compositions (Lipase Test)

About 0.5 g of the nondigestible fat composition is melted and added to 25 ml of a Tris buffer solution (58.4 g NaCl (1.0M), 5.3 g $CaCl_2 \times 2H_2O$ (36 mM), 67.7 g Trizma (0.5M) diluted to 1 liter with with deionized water and adjusted to pH 8.0 with concentrated HCl) in a 125 ml Erlenmeyer flask. To this mixture is added 1.0 ml of a 1.0% sodium taurocholate solution (Sigma Chemical) and 0.5 ml of a 45.0% $CaCl_2 \times 2H_2O$ solution. About 5 glass beads are added, the flask stoppered and placed in water bath controlled at 37° C. equipped with wrist action shaker. The sample is shaken for 1 hour then 1 ml of lipase solution (750 mg of lipase (Sigma Chemical type II, crude from porcine pancreas) diluted to 50 ml with the Tris buffer solution described above) is added. The mixture is shaken at 37° C. for one hour.

The reaction is terminated by the addition of 10 ml of concentrated HCl, 25 ml of deionized water and 10 ml of ethanol. The liberated free fatty acids are extracted with 3–100 ml portions of diethyl ether/petroleum ether (1:1 by volume). The combined extracts are washed with 3–10 ml portions of deionized water. The organic layer is dried with anhydrous sodium sulfate and filtered through Whatman #41 filter paper. The ether solvents are removed by rotary evaporation at 55° C.

The residue is washed into a 150 ml beaker with 2–30 ml portions of hot isopropyl alcohol/water (85/15 v/v). The mixture is titrated with standardized 0.1N NaOH solution to a phenolphthalein endpoint. A blank (no added test material) is run through the entire procedure and titrated also. The "lipase ester value" (LEV) is calculated from the following equation:

$$LEV = (((s-B) \times N \times 56.1)/W) - AV$$

where

S=volume in mls of NaOH required to titrate the sample
B=volume in mls of NaOH required to titrate the blank
N=normality of the NaOH
W=sample weight on grams
AV=acid value of the sample (described hereinabove)

The percent hydrolysis is calculated from the following equation:

$$\% \text{ Hydrolysis} = (LEV) \times 100/(EV)$$

where

LEV=lipase ester value (hereinabove)
EV=ester value (described hereinabove)

Using these conditions and this enzyme preparation, only the esters of primary hydroxyl groups are hydrolyzed. For example, the LEV of pure triolian (triglyceride containing three oleic acid esters) is 126.9, the SV is 190.4 and the % hydrolysis is 66.7%. However, the triolian also contains hydroxyl groups other than primary hydroxyl groups which must be accounted for in determining digestibility of the triolian even though these other hydroxyl groups are not hydrolyzed under the conditions of this method. Therefore, it is assumed that triolian, a conventional triglyceride, is 100% digestible and the value of 66.7% hydrolysis obtained for the triolian sample according to this method is normalized to 100%. According to the definition of nondigestibility set forth hereinbefore in the Definitions section, only about 70% of the sample can be hydrolyzed versus a triglyceride by the enzymes in this lipase test. Therefore, for a fat composition to be considered nondigestible, the % hydrolysis value obtained for the sample according to this method should be 46.7% or less, preferably 13.3% or less, more preferably 6.7% or less.

9. Thickness of Polyglycerol Ester Particles (Light Microscopy)

The thickness of the solid polyol polyester particles formed in the nondigestible at composition herein may be estimated at room temperature with a Nikon Microphot video-enhanced light microscope (VELM) using Hoffman Modulation Contrast (HMC) optics according to the following method:

1. A small portion (i.e., 1–10 mg) of the nondigestible fat sample with the solid polyglycerol ester particles dispersed therein is placed on a microscope slide and covered. The slide is placed under the microscope.
2. The sample is examined using a HMC 100× oil objective as the standard lens in conjunction with a 10× eyepiece lens.
3. A microscope-mounted video camera and associated controller are used for video enhancement to facilitate differentiation between the sample and the background.
4. The thickness of the solid polyol polyester particles is measured in um.

This method permits differentiation of particles having thicknesses just within the resolution of the VELM (approximately 0.2–0.5 um). Particle thickness of particles having smaller dimensions can be determined by the Freeze Fracture Method described hereinafter.

(Note: No special sample preparation is required, other than obtaining a representative sample. The samples should be melted and cooled ambiently.)

Reference: Robert Hoffman, "The Modulation Contrast Microscope: Principles and Performances", *Journal of Microscopy*, Vol. 110, Pt 3, August 1977, pp. 205–222.

10. Thickness of Solid Polyol Polyester Particles-Freeze Fracture Transmission Electron Microscopy The three-dimensional topography of particles of polyol polyesters and their size can be determined by a freeze-fracture transmission electron microscopy (ff-tem) method. This freeze-fracture method is carried out as follows:

1. The outside cavity of a freezing container is filled with liquid $N_2$ and the inner dewar of the freezing container is filled with liquid ethane (normal melting temperature of −172° C.). The ethane is allowed to freeze.
2. A small amount (1–2 ul) of the nondigestible fat sample with the solid polyol polyester particles dispersed therein is placed in the well of a gold-plated Balzers specimen holder. (Note: for very fluid samples, 1–2 ul of sample is placed on a gold planchet (Balzers) and another planchet is placed on top of the first to form a sandwich.)

3. Most of the frozen ethane in the dewar is melted by inserting a metal eat sink (e.g., tweezers) into the dewar.
4. Immediately after melting the ethane, the specimen holder containing the nondigestible fat sample is picked up using a pair of tweezers and rapidly plunged into the liquid ethane.
5. After a few seconds, the specimen holder is removed from the ethane, quickly touched to the tip of a camel's hair brush to remove excess ethane, and immediately immersed in the liquid $N_2$ to keep the sample cold.
6. The sample is transferred under liquid $N_2$ to a JEOL JFD-9000C sample holder and then transferred into the chamber of a JEOL JFD-9000C freeze-fracture unit. The temperature of the unit should be about $-175°$ C. Vacuum should be at least $8 \times 10^{-7}$ torr.
7. A knife is cooled to a temperature of about $-165°$ C.
8. The sample is fractured in the JEOL chamber using the pre-cooled knife.
9. Platinum-carbon is deposited onto the fractured sample at a 45° angle for 4.5 seconds, followed by carbon deposition at a 90° angle for 25 seconds to form a replica of the fractured sample. The high voltage is 2500 and the current is 70 mA.
10. The samples are removed from the freeze fracture unit and cleaned using 3 washes of chloroform.
11. The replica is picked up on a 300 mesh copper EM grid and examined in a transmission electron microscope.
12. Images are recorded on negative film and positive prints are made from the negatives.
13. The thickness of the polyol polyester particles is measured in nm.

References:

Rash, J. E. and Hudson, C. S., *Freeze Fracture: Methods, Artifacts, and Interpretations*, New Haven Press, New York, 1979.

Stolinski and Breathnach, *Freeze Fracture Replication of Biological Tissues*, Academic Press, London, 1975.

Steinbrecht and Zierold, *Cryotechniques in Biological Electron Microscopy*, Springer-Verlag, Berlin, 1987.

H. Specific Examples

Specific preparation of the nondigestible fat compositions of the present invention is illustrated by the following examples:

Example I

Solid Polyglycerol Ester Preparation 200 grams of a wide distribution polyglycerol containing di- through hepta-glycerols (average n-bar=3.35) is prepared in an industrial scale process using the procedure described in Babayan; U.S. Pat. No. 3,637,774; Issued Jan. 25, 1972 (incorporated herein by reference). The polyglycerol is then fractionated on a laboratory scale Pope wiped film evaporator to remove water, glycerine, diglycerol, and triglycerol. The fractionated polyglycerol is run through the evaporator at a rate of 0.8 to 1.2 g/min., at 190–191° C. and a pressure of 0.15 to 0.8 mm HG. About 74 g of distillate and about 106 g of product are isolated (most of the water flashes off and is lost to the vacuum system). The final polyglycerol product contains only trace amounts of water and glycerine, and has reduced diglycerol and triglycerol levels, with an n-bar of 4.76. The average degree of polymerization is 4.76 and the average molecular weight is 370.2.

The reaction is conducted in a 100 ml spherical glass reaction vessel equipped with a nitrogen inlet and magnetic stirrer. The temperature is controlled by means of an oil bath, thermometer and temperature controller. Approximately 5.00 grams (13.5 mMoles) of the finished polyglycerol described above are added to the reactor along with 150 ml of dry pyridine and 75 of dry dimethylformadide. The polyglycerol is allowed to dissolve at room temperature, and then a mixture of palmitoyl chloride (3.30 g, 12.0 mMoles) and stearoyl chloride (24.2 g, 80.0 mMoles) is added. The clear, slightly yellow reaction mixture is heated to about 50–52° C. for approximately 4.0 hours with stirring under an atmosphere of dry nitrogen.

Next, most of the pyridine and dimethylformamide are removed from the reaction mixture by rotary evaporation at 70–80° C. and a pressure of about 15 mm HG. The crude product is dissolved in 200 ml of dichloromethane and transferred to a 500 ml separatory funnel. The solution is washed with 2–200 ml portions of 10% aqueous HCL and finally 2–200 ml portions of distilled deionized water. The organic phase is dried with anhydrous sodium sulfate, filtered and the solvent removed by rotary evaporation.

The resulting solid polyglycerol ester has the following attributes:

| | |
|---|---|
| Saponification Value: | 179.8 |
| Acid Value: | 32.0 |
| Corrected Ester Value: | 176.2 |
| Melting Point: | 54.8 |
| n-bar: | 4.97 |
| i-bar: | 6.66 |
| % esterification: | 95.6 |
| Avg. $MW_{FA}$: | 278.5 |
| Fatty Acid Content: | |
| $C_{14}$ | 0.1 |
| $C_{16}$ | 11.4 |
| $C_{17}$ | 0.2 |
| $C_{18:0}$ | 86.3 |
| $C_{18:1}$ | 0.6 |
| $C_{20}$ | 0.6 |

Fat Composition Preparation

Four (4) grams of this solid polyglycerol ester product and 96 grams of a liquid sucrose polyester, in which the sucrose is substantially completely esterified with fatty acid groups of cottonseed oil, are mixed and heated until all the solids are dissolved. The mixture is then allowed to cool back to room temperature at a rate of 33.3° F./min. The resulting fat composition is suitable for use as a food fat. Because the fat composition has a Thixotropic Area Value of 19.0, it does not produce passive oil loss which would otherwise result if only liquid sucrose polyester were used. Also, since the level of solids in these fat compositions is so low, food products containing these fat compositions will not be waxy tasting.

The above liquid sucrose polyester has the attributes set forth in Table I.

TABLE I

| FATTY ACID COMPOSITION | LIQUID SUCROSE POLYESTER % |
|---|---|
| $C_{14}$ | 0.2 |
| $C_{16}$ | 17.0 |
| $C_{17}$ | 0.1 |
| $C_{18:0}$ | 5.3 |
| $C_{18:1}$ | 36.8 |

TABLE I-continued

|  | LIQUID SUCROSE POLYESTER % |
|---|---|
| $C_{18:2}$ | 38.4 |
| $C_{18:3}$ | 0.4 |
| $C_{20}$ | — |
| ESTER DISTRIBUTION | |
| % Octa | 78.8 |
| % Hepta | 20.8 |
| % Hexa | <0.1 |
| % Lower | 0.3 |

Example II

Solid Polyglycerol Ester Preparation

Polyglycerol Preparation

A polyglycerol is prepared in an industrial scale process using the procedure described by Babayan; U.S. Pat. No. 3,637,774; Issued Jan. 25, 1972. The polyglycerol is fractionated to remove water, glycerine and some of the diglycerol. The resulting narrow distribution polyglycerol had an n-bar of 3.16 and contains mostly di-, tri-, and tetraglycerol with small amounts of penta- through hepta-glycerol. The average degree of polymerization is 3.16 and the average molecular weight is 251.8.

Behenic Methyl Ester Preparation

Behenic methyl esters are made from behenic mono- and diglycerides. 3,950 lbs. of behenic glycerides (monoglycerides 27.5%, diglycerides 67.5%, and Triglycerides 5.0%), 660 lbs. of methanol, and 70 lbs. of sodium methylate solution (25% on methanol) are added to a 750 gallon reactor. The mixture is reacted at 65° C. for approximately 2 hours while refluxing the methanol. The agitation is stopped, and the glycerin is allowed to settle for about 2 hours. The glycerin settles to the bottom and is remove through the bottom outlet. An additional 60 lbs. of methanol and 11 lbs. of sodium methylate solution (25% in methanol) are added to the reactor, and the mixture is reacted at about 65° C. for one hour. The agitation is stopped, the glycerin is settled for two hours, and removed through the bottom outlet. 1,500 lbs. of water is added to the mixture, stirred for 10 minutes, and settled for one hour. The water is then removed through the bottom outlet of the reactor. The methyl ester is then dried under a vacuum of 5–10 mm Hg at a temperature of 65° C. The methyl ester is flash distilled from the reactor through a condenser and into a receiver. Distillation conditions are 300° F.–440° F. and 1–5 mm Hg. The distillate purity is 95% $C_{22}$, 2% $C_{24}$, and 2.2% $C_{20}$. Monoglycerides and glycerine are undetectable in the distillate.

Polyglycerol Esterification

The esterification reaction is conducted in a 1 liter spherical glass reaction vessel equipped with a nitrogen inlet, vacuum outlet and a mechanical stirrer. The temperature is controlled by means of a heating mantel, thermometer and temperature controller. 27.4 grams (0.109 Moles) of the polyglycerol described above is added to reactor, along with 263.0 g (0.743 Moles) methyl behenate and 1.4 grams (0.010 Moles) potassium carbonate. The pressure in the system is reduced to about 6.0 mm HG while simultaneously raising the temperature to 135° C. The reaction mixture is heated with stirring at this temperature for a total of eleven hours during which time the pressure drops to 0.4 mm HG.

The product is refined by slurring the crude reaction mixture with 1% silica gel followed by filtration to remove the solids. The excess methyl esters are removed on a Pope wiped film evaporator operated at a temperature of 210° C. and a pressure of 0.05 mm HG.

The resulting solid polyglycerol ester has the following attributes:

| | |
|---|---|
| Saponification Value: | 145.7 |
| Acid Value: | 0.1 |
| Corrected Ester Value: | 145.7 |
| n-bar: | 3.11 |
| i-bar: | 3.87 |
| Melting Point: | 72.2° C. |
| Degree of Esterification | 75.7% |
| Avg. $MW_{fa}$ | 338.9 |
| Fatty Acid Composition: | |
| $C_{16}$ | 0.2 |
| $C_{18:0}$ | 0.5 |
| $C_{18:1}$ | 0.1 |
| $C_{18:2}$ | 0.1 |
| $C_{20}$ | 2.1 |
| $C_{22:0}$ | 94.7 |
| $C_{22:1}$ | 0.2 |
| $C_{24}$ | 2.0 |

Fat Composition Preparation

Four (4) grams of this solid polyglycerol ester product and 94 grams of the liquid sucrose polyester described in Example I are mixed and heated until all the solids dissolve. The mixture is then allowed to cool back to room temperature at a rate of 33.3° F./min. The resulting fat composition has a Thixotropic Area Value of 44.3, and thus, does not produce passive oil loss when used as a food fat. Also, since the level of solids in this fat compositions is so low, food products containing this fat composition will not be waxy tasting.

Example III

Solid Polyglycerol Ester Preparation

A commercially available narrow distribution (n-bar 3.19) PGE (Triodan 55, Lot #00202, Grinsted Denmark) is fractionated to remove most of the monoesters and some of the diesters leaving mostly di-, tri- and tetraesters with small amounts of penta- through heptaester. The starting polyglycerol ester has an i-bar of 1.30 and a degree of esterification of 25%.

The resulting solid polyglycerol ester has the following attributes:

| | |
|---|---|
| Saponification Value: | 159.4 |
| Acid Value: | 0.6 |
| Corrected Ester: | 159.3 |
| n-bar: | 3.54 |
| i-bar: | 2.83 |
| Melting Point: | 56.2° C. |
| Degree of Esterification: | 51.1% |
| $MW_{fa}$: | 271.2 |
| LEV | 1.8 |
| Fatty Acid Composition: | |
| $C_{12}$ | 0.1 |
| $C_{14}$ | 1.2 |
| $C_{15}$ | 0.1 |
| $C_{16:0}$ | 41.2 |
| $C_{16:1}$ | 0.2 |
| $C_{17}$ | 0.3 |
| $C_{18:0}$ | 55.6 |

-continued

| | |
|---|---|
| $C_{18:1}$ | 0.2 |
| $C_{18:2}$ | 0.2 |
| $C_{20}$ | 0.7 |

Fat Composition Preparation

Figure 2:
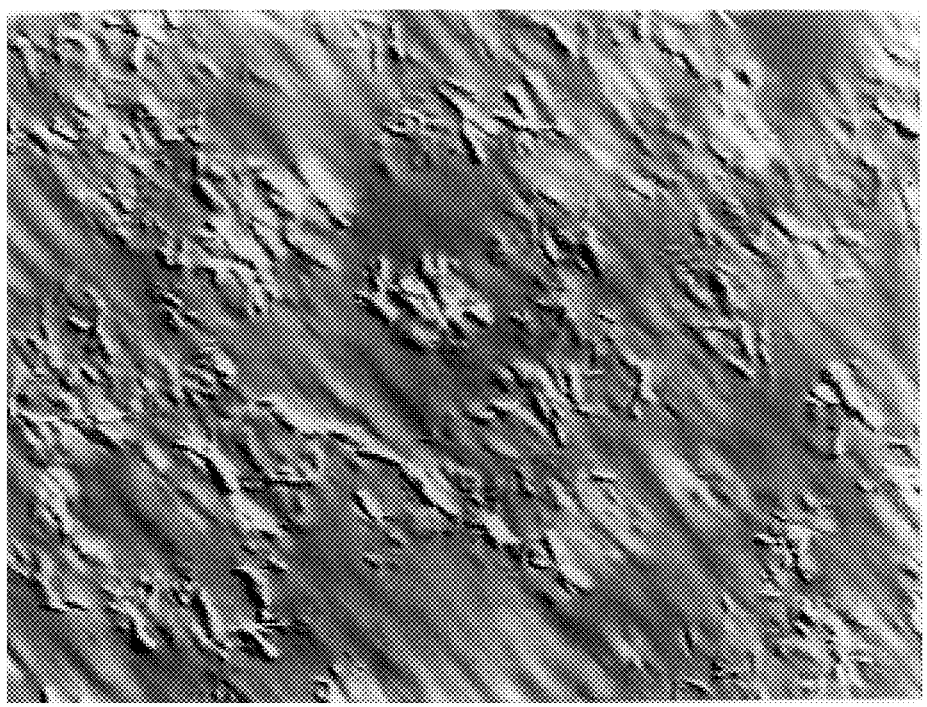
FIG. 2 is a photomicrograph (magnification of 1000x) depicting particles of solid polyglycerol ester dispersed in a liquid sucrose polyester.

Six (6) grams of this solid polyglycerol ester product and 94 grams of liquid sucrose polyester described in Example I are mixed and heated until all the solids are dissolved. The mixture is then allowed to cool back to room temperature at a rate of 33.3° F./minute. The cooling brings about crystallization of the solid polyglycerol ester material in the form of small, two-dimensional particles which are dispersed in the liquid nondigestible oil. FIG. 2 is a photomicrograph depicting the two-dimensional structure of the solid polyglycerol ester particles. These particles have a thickness of less than about 100 μm as measured by Freeze Fracture Transmission Electron Microscopy described hereinafter in the Analytical Methods section.

The fat composition comprising the solid particles of polyglycerol ester dispersed in the liquid sucrose polyester has a Thixotropic Area Value of 38.0, and thus, does not produce passive oil loss which would otherwise result if only the liquid nondigestible oil were to be used as a food fat. The SFC profile slope of the nondigestible fat composition is −0.1% solids/° F. As a result of this relatively flat SFC profile slope and the low solids level, food products containing this fat composition will not be waxy tasting.

Example IV

Norchip potatoes are used which have been sliced to a thickness of about 0.052 inches (0.13 cm). The sliced potatoes are fried in a 5 pound batch fryer at a temperature of 365° F. (180° C.) for 3 minutes. Approximately 225 potato chips are fried in each of the fat compositions of Examples I, II and III.

Ingestion of these potato chips which contain the nondigestible fat compositions will not result in passive oil loss, and the potato chips are not unacceptably waxy

What is claimed is:

1. A nondigestible fat composition useful as a replacement for triglyceride fats or oils in foods, which composition has a Solid Fat Content profile slope between 70° F. and 98.6° C. of from 0 to about −0.75% solids/° F. and which composition comprises:
    A. a liquid nondigestible oil having a complete melting point below about 37° C; and
    B. nondigestible solid particles of a polyglycerol ester dispersed in said oil in an amount sufficient to control passive oil loss upon ingestion of said composition, said nondigestible solid particles having a complete melting point above about 37° C., wherein the ester groups forming said polyglycerol ester are formed from long chain fatty acid radicals with at least about 40% of said long chain fatty acids being saturated and having at least 18 carbon atoms, wherein said polyglycerol esters have an Iodine Value of less than about 1, and wherein said nondigestible particles serve to impart to said composition a Thixotropic Area Value of about 10 kPa/sec or greater; and
    wherein the solid nondigestible polyglycerol esters are formed in the liquid nondigestible oil as platelet-like particles having a thickness of 1 micron or less.

2. The nondigestible fat composition of claim 1 which comprises from about 60% to about 99% liquid nondigestible oil and from about 1% to about 40% solid polyglycerol ester particles.

3. The nondigestible fat composition of claim 2 wherein the solid polyglycerol ester contains at least about 2 glycerol moieties and wherein at least about 30% of the hydroxyl groups of the solid polyglycerol ester are esterified.

4. The nondigestible fat composition of claim 3 wherein in the polyglycerol ester the average degree of glycerine polymerization is from about 2 to 10.

5. The nondigestible fat of claim 4 wherein in the polyglycerol ester at least about 50% of the long chain fatty acids are saturated and have at least 18 carbon atoms.

6. The nondigestible fat composition of claim 5 wherein the nondigestible solid particles serve to impart to said composition a Thixotropic Area Value of about 25 kPa/sec or greater.

7. The nondigestible fat composition of claim 6 wherein the liquid nondigestible oil is a liquid sucrose fatty acid polyester.

8. The nondigestible fat composition of claim 7 wherein the ester groups forming the solid polyglycerol ester comprise (i) ester groups formed from $C_{22}$ radicals, (ii) ester groups formed from a mixture of $C_{16}$ and $C_{18}$ radicals in a molar ratio of $C_{16}:C_{18}$ ranging from about 50:50 to about 0.1:99.9, or (iii) a combination thereof.

9. The nondigestible fat composition of claim 8 having a Solid Fat Content profile slope between 70° F. and 98.6° F. of from 0 to −0.5% solids/° F.

10. The nondigestible fat composition of claim 9 wherein in the polyglycerol ester at least about 75% of said long chain fatty acids are saturated and have at least 18 carbon atoms and wherein the nondigestible solid particles serve to impart to said composition a Thixotropic Area Value of about 45 kPa/sec or greater.

11. The nondigestible fat composition of claim 10 wherein the solid polyglycerol ester contains from about 3 to about 10 glycerol moieties and wherein at least 50% of the hydroxyl groups of the solid polyglycerol ester are esterified.

12. The nondigestible fat composition of claim 11 wherein in the polyglycerol ester the average degree of glycerine polymerization is from about 3 to 6.

13. A nondigestible fat composition useful as a replacement for triglyceride fats or oils in foods, which composition has a Solid Fat Content profile slope between 70° F. and 98.6° F. of from 0 to about −0.3% solids/° F. and which composition comprises:
    A. from about 80% to about 99% of a liquid sucrose fatty acid polyester having a complete melting point below about 37° C., and
    B. from about 1% to about 20% nondigestible solid particles of a polyglycerol ester dispersed in said liquid sucrose fatty acid polyester, said nondigestible solid particles having a complete melting point above about 37° C., wherein said polyglycerol ester material contains from about 4 to about 8 glycerol moieties, wherein at least about 50% of the hydroxyl groups of the solid polyglycerol ester are esterified; wherein the polyglycerol esters have an Iodine Value of less than about 1, and wherein the ester groups forming said polyglycerol ester are formed from long chain fatty acid radicals with at least about 85% of said long chain fatty acids being saturated and having at least 18 carbon atoms;
    and wherein said particles further serve to impart to said composition a Thixotropic Area Value of about 45 kPa/sec or greater and
    wherein the solid nondigestible polyglycerol esters are formed in the liquid nondigestible oil as platelet-like particles having a thickness of 1 micron or less.

14. The nondigestible fat composition of claim 13 wherein in the polyglycerol ester the average degree of glycerine polymerization is from about 3 to 6.

15. The nondigestible fat composition of claim 14 having a Solid Fat Content profile slope between 70° F. and 98.6° F. of from 0 to about −0.1% solids/° F.

16. The nondigestible fat composition of claim 15 which comprises from about 85% to about 99% liquid sucrose fatty acid polyester and from about 1% to about 15% solid polyglycerol ester particles.

17. A food product comprising an edible substrate and from 10% to 100% of the nondigestible fat composition of claim 1.

18. The food product of claim 17 wherein the edible substrate is a potato chip.

19. A thickened digestible oil product comprising:

A. from about 85% to about 99% of a digestible edible oil; and

B. from about 1% to about 15% nondigestible solid particles of a solid polyglycerol ester, said nondigestible solid particles having a complete melting point above about 37° C., wherein the ester groups forming said polyglycerol ester are formed from long chain fatty acid radicals with at least about 40% of said long chain fatty acids being saturated and having at least 18 carbon atoms, wherein said polyglycerol esters have an Iodine Value of less than about 1, and wherein said nondigestible particles serve to impart to said composition a Thixotropic Area Value of about 10 kPa/sec or greater and wherein the solid nondigestible polyglycerol esters are formed in the liquid nondigestible oil as platelet-like particles having a thickness of 1 micron or less.

\* \* \* \* \*